(12) United States Patent
Momoki et al.

(10) Patent No.: US 10,561,979 B2
(45) Date of Patent: Feb. 18, 2020

(54) COMPRESSED AIR DRYING SYSTEM AND CHECK VALVE USED IN COMPRESSED AIR DRYING SYSTEM

(71) Applicant: NABTESCO AUTOMOTIVE CORPORATION, Tokyo (JP)

(72) Inventors: Masanori Momoki, Tokyo (JP); Nobushige Matsuie, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 66 days.

(21) Appl. No.: 15/567,501

(22) PCT Filed: Apr. 19, 2016

(86) PCT No.: PCT/JP2016/062435
§ 371 (c)(1),
(2) Date: Oct. 18, 2017

(87) PCT Pub. No.: WO2016/171147
PCT Pub. Date: Oct. 27, 2016

(65) Prior Publication Data
US 2018/0111082 A1    Apr. 26, 2018

(30) Foreign Application Priority Data

Apr. 20, 2015   (JP) ................................ 2015-085962
Feb. 5, 2016    (JP) ................................ 2016-021103

(51) Int. Cl.
*B01D 53/02* (2006.01)
*B01D 53/26* (2006.01)
(Continued)

(52) U.S. Cl.
CPC ....... *B01D 53/261* (2013.01); *B01D 53/0454* (2013.01); *F16K 15/02* (2013.01); *B01D 2259/4566* (2013.01)

(58) Field of Classification Search
CPC ........ B01D 2259/4566; B01D 53/0454; B01D 53/26; B01D 53/261; B60T 17/00;
(Continued)

(56) References Cited

U.S. PATENT DOCUMENTS

2002/0122727 A1* 9/2002 Gaither .................. F04B 17/05
                                                     417/16
2008/0091176 A1* 4/2008 Alessi .................. A61K 9/0004
                                                    604/892.1
(Continued)

FOREIGN PATENT DOCUMENTS

GB    2200575 A    8/1988
JP    42-13683 B1   8/1967
(Continued)

OTHER PUBLICATIONS

International Search Report PCT/JP2016/062435 dated Jun. 7, 2016 with English translation.
(Continued)

*Primary Examiner* — Christopher P Jones
(74) *Attorney, Agent, or Firm* — Pillsbury Winthrop Shaw Pittman LLP

(57) ABSTRACT

A compressed air drying system includes a forced-induction device, a compressor to which the forced-induction device is connected, a removal device that performs a loading mode operation and an unloading mode operation, a pressure regulating device that opens and closes a drain valve device using air pressure, and a check valve, which includes a body and a piston. The body has a first port connected to the compressor, a second port connected to the removal device, and a third port connected to the pressure regulating device. The piston is slidably arranged in the body. The hardness of the material of a slidable-contact portion of the body that slidably contacts the piston is different from the hardness of the material for the piston.

10 Claims, 12 Drawing Sheets

(51) Int. Cl.
*F16K 15/02* (2006.01)
*B01D 53/04* (2006.01)

(58) Field of Classification Search
CPC ...... B60T 17/004; F16K 15/02; F16K 15/021;
F16K 15/025; F16K 15/18
See application file for complete search history.

(56) References Cited

U.S. PATENT DOCUMENTS

| | | |
|---|---|---|
| 2011/0139263 A1 | 6/2011 | Hilberer |
| 2015/0218987 A1* | 8/2015 | Minato .............. B01D 53/0407 96/113 |
| 2015/0258492 A1 | 9/2015 | Nishihara et al. |
| 2017/0216764 A1* | 8/2017 | Garfinkle ............... B01D 53/22 |

FOREIGN PATENT DOCUMENTS

| | | |
|---|---|---|
| JP | 63-22389 Y2 | 6/1988 |
| JP | 02-83024 U | 12/1988 |
| JP | 02-16072 Y2 | 5/1990 |
| JP | 02-47816 Y2 | 12/1990 |
| JP | 04-114418 U | 10/1992 |
| JP | 2003-301954 A | 10/2003 |
| JP | 2004-108655 A | 4/2004 |
| JP | 2004-144169 A | 5/2004 |
| JP | 2004-232833 A | 8/2004 |
| WO | 2014/061582 A1 | 4/2014 |

OTHER PUBLICATIONS

International Preliminary Report on Patentability PCT/JP2016/062435 dated Oct. 24, 2017.

* cited by examiner

COMPRESSED AIR DRYING SYSTEM AND CHECK VALVE USED IN COMPRESSED AIR DRYING SYSTEM

CROSS-REFERENCE TO RELATED APPLICATIONS

This application is the U.S. National Phase of PCT/JP2016/062435 filed Apr. 19, 2016, which claims priority to Japanese Patent Application No. 2015-085962 filed Apr. 20, 2015, and Japanese Patent Application No. 2016-021103 filed Feb. 5, 2016. The subject matter of each is incorporated herein by reference in entirety.

TECHNICAL FIELD

The present invention relates to a compressed air drying system that dries compressed air supplied from a compressor and a check valve used in the compressed air drying system.

BACKGROUND ART

An automobile such as a truck, a bus, or a construction machine controls a system such as the brakes or the suspension using compressed air, which is delivered from a compressor connected to the internal combustion engine. In some cases, an air drier is arranged downstream of the compressor to remove water and oil from the compressed air.

The air drier is filled with desiccant such as silica gel or zeolite. The air drier performs a loading mode operation, in which water is removed from the compressed air, and an unloading mode operation, in which the desiccant is regenerated. In the loading mode operation, the compressed air delivered from an inlet port of the air drier passes through the desiccant and is discharged from an outlet port of the air drier as dry compressed air. In the unloading mode operation, a drain valve device arranged in the air drier is opened to pass the dry compressed air through the desiccant in the direction opposite to that in the loading mode operation. This removes the oil and water that has been trapped by the desiccant and discharges the oil and water from the drain valve device as collected liquid.

The compressed air to be supplied to the compressor may be generated using a forced-induction device that is attached to an internal combustion engine or the like of a vehicle. This decreases the compression amount of air by the compressor, thus improving the efficiency and reducing the size of the compressor. However, if the inlet port of the air drier is open in the unloading mode operation, the compressed air that has flowed in from the inlet port is discharged from the drain valve device, which is open, into the atmospheric air. That is, the compressed air supplied from the forced-induction device is discharged into the atmospheric air through the compressor. The forced-induction pressure of the forced-induction device is thus decreased. To solve this problem, arranging a check valve (an inlet port opening/closing device) in the air drier has been proposed by which the inlet and outlet ports of the air drier are opened in the loading mode operation and closed in the unloading mode operation (see, for example, Patent Document 1).

PRIOR ART DOCUMENT

Patent Document

Patent Document 1: International Publication No. 2014/061582

SUMMARY OF THE INVENTION

Problems that the Invention is to Solve

Since the inlet port of the above-described check valve is connected to the compressor, the compressed air, which has high pressure and high temperature and contains oil, flows into the check valve. Under such severe conditions, the check valve must maintain a high sealing performance and thus needs highly frequent maintenance work. Therefore, the check valve, which is connected to the compressor, is demanded to have improved durability.

This problem is generally common not only to vehicles but also to devices in which a compressed air drying system, which is connected to a forced-induction device and purifies compressed air, is mounted.

Accordingly, it is an objective of the present invention to provide a check valve capable of improving its durability and a compressed air drying system including the check valve.

Means for Solving the Problems

In accordance with one aspect of the present invention, a compressed air drying system is provided that includes a compressor, a removal device, a pressure regulating device, and a check valve. The compressor is configured such that a forced-induction device is connected to the compressor. The removal device performs a loading mode operation, in which at least one of water and oil contained in compressed air delivered from the compressor is trapped, and an unloading mode operation, in which collected liquid containing the at least one of water and oil that has been trapped is discharged through a drain valve device. The pressure regulating device is arranged inside or outside the removal device and selectively opens and closes the drain valve device using air pressure. The check valve includes a body and a piston. The body has a first port connected to the compressor, a second port connected to the removal device, and a third port connected to the pressure regulating device, and the piston is slidably arranged in the body. A hardness of at least a material of a slidable-contact portion of the body that slidably contacts the piston is different from a hardness of a material of the piston.

In accordance with another aspect of the present invention, a check valve used in a compressed air drying system is provided. The compressed air drying system includes a compressor, a removal device, and a pressure regulating device. The compressor is configured such that a forced-induction device is connected to the compressor. The removal device performs a loading mode operation, in which at least one of water and oil contained in compressed air delivered from the compressor is trapped, and an unloading mode operation, in which collected liquid containing the at least one of water and oil that has been trapped is discharged through a drain valve device. The pressure regulating device is arranged inside or outside the removal device and selectively opens and closes the drain valve device using air pressure. The check valve includes a body and a piston. The body has a first port connected to the compressor, a second port connected to the removal device, and a third port connected to the pressure regulating device. The piston is slidably arranged in the body. A hardness of at least a material of a slidable-contact portion of the body that slidably contacts the piston is different from a hardness of a material of the piston.

In accordance with another aspect of the present invention, a compressed air drying system is provided that includes a compressor, a removal device, a pressure regulating device, and a check valve. The compressor is configured such that a forced-induction device is connected to the compressor. The removal device performs a loading mode operation, in which at least one of water and oil contained in compressed air delivered from the compressor is trapped, and an unloading mode operation, in which collected liquid containing the at least one of water and oil that has been trapped is discharged through a drain valve device. The pressure regulating device is arranged inside or outside the removal device and selectively opens and closes the drain valve device using air pressure. The check valve includes a body and a piston. The body has a first port connected to the compressor, a second port connected to the removal device, and a third port connected to the pressure regulating device, and the piston is slidably arranged in the body. A plurality of sealing members is arranged between the piston and the body.

In accordance with another aspect of the present invention, a check valve used in a compressed air drying system is provided. The compressed air drying system includes a compressor, a removal device, and a pressure regulating device. The compressor is configured such that a forced-induction device is connected to the compressor. The removal device performs a loading mode operation, in which at least one of water, and oil contained in compressed air delivered from the compressor is trapped and an unloading mode operation, in which collected liquid containing the at least one of water and oil that has been trapped is discharged through a drain valve device. The pressure regulating device is arranged inside or outside the removal device and selectively opens and closes the drain valve device using air pressure. The check valve includes a body and a piston. The body has a first port connected to the compressor, a second port connected to the removal device, and a third port connected to the pressure regulating device. The piston is slidably arranged in the body. A plurality of sealing members is arranged between the piston and the body.

In accordance with one aspect of the present invention, a compressed air drying system is provided that includes a compressor, a removal device, a pressure regulating device, and a check valve. The removal device performs a loading mode operation, in which at least one of water and oil contained in compressed air delivered from the compressor is trapped, and an unloading mode operation, in which collected liquid containing the at least one of water and oil that has been trapped is discharged through a drain valve device. The pressure regulating device is arranged inside or outside the removal device. The pressure regulating device selectively opens and closes the drain valve device using air pressure and outputs a signal representing the unloading mode operation to the compressor using the compressed air. The check valve includes a body and a piston. The body has a first port connected to the compressor, a second port connected to the removal device, and a third port into which the signal is input, and the piston is slidably arranged in the body. The piston includes a contact member, which contacts the body and is an elastic body, and a slidable-contact member, which slidably contacts the body.

In accordance with another aspect of the present invention, a check valve used in a compressed air drying system is provided. The compressed air drying system includes a compressor, a removal device, and a pressure regulating device. The removal device performs a loading mode operation, in which at least one of water and oil contained in compressed air delivered from the compressor is trapped, and an unloading mode operation, in which collected liquid containing the at least one of water and oil that has been trapped is discharged through a drain valve device. The pressure regulating device is arranged inside or outside the removal device. The pressure regulating device selectively opens and closes the drain valve device using air pressure and outputs a signal representing the unloading mode operation to the compressor using the compressed air. The check valve includes a body and a piston. The body has a first port connected to the compressor, a second port connected to the removal device, and a third port into which the signal is input. The piston is slidably arranged in the body. The piston includes a contact member, which contacts the body and is an elastic body, and a slidable-contact member, which slidably contacts the body.

MODES FOR CARRYING OUT THE INVENTION

First Embodiment

A compressed air drying system according to a first embodiment will now be described with reference to FIGS. 1 to 7. The compressed air drying system is mounted in an automobile such as a truck, a bus, and a construction machine.

Figure 1:
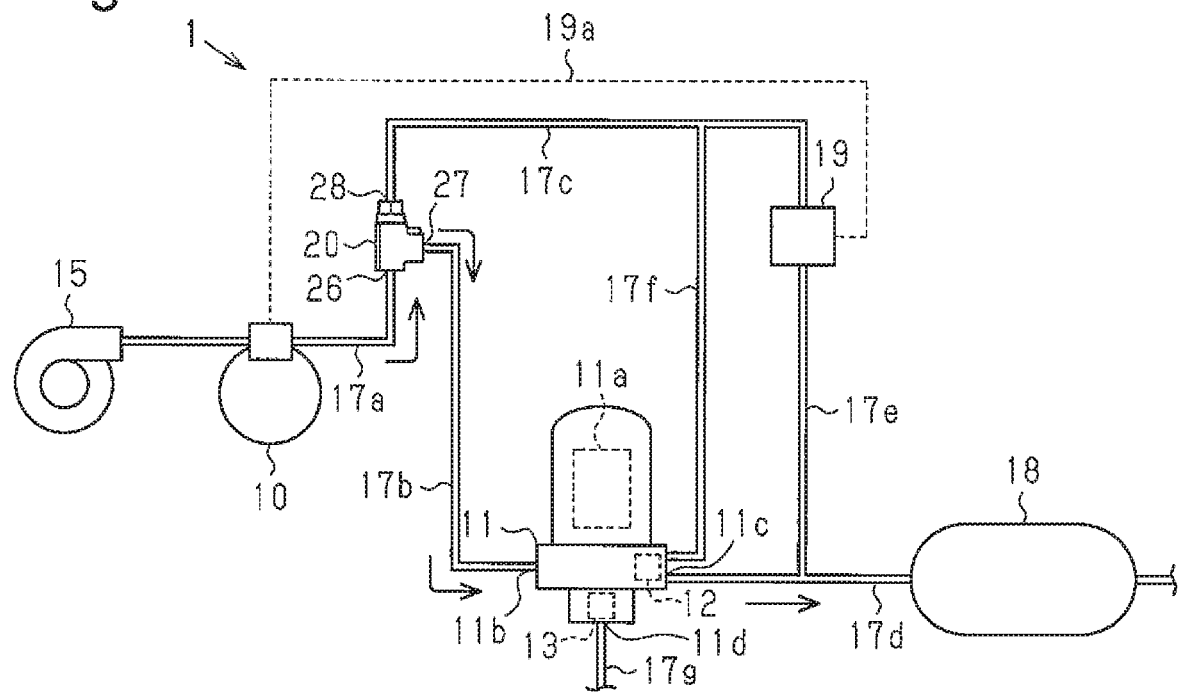
FIG. 1 is a block diagram representing the flow of compressed air in a loading mode operation of an air drier in a first embodiment of a compressed air drying system.

As shown in FIG. 1, a compressed air drying system 1 is connected to the downstream side of a forced-induction device 15, which is connected to an internal combustion engine. The compressed air drying system 1 includes a compressor 10, an air drier 11 serving as a removal device, and a governor device 19 serving as a pressure regulating device. The compressed air drying system 1 removes oil and water from the compressed air delivered from the compressor 10, which is connected to the forced-induction device 15, by means of the air drier 11 and supplies the dry compressed air to system such as the brakes or the suspension. The amount of compression required by the compressor 10 is small since the air that is being received has been compressed by the forced-induction device 15. Thus, the size of the compressor 10 is reduced as compared to a compressor that is mounted in a vehicle lacking something like the forced-induction device 15.

The compressor 10 is connected to a turbo check valve 20 through a line 17a. The turbo check valve 20 is a check valve that has a first port 26, a second port 27, and a third port 28. The first port 26 is connected to the compressor 10 through the line 17a. The second port 27 is connected to the air drier 11 through a line 17b. The third port 28 is connected to the governor device 19 through a line 17c.

The air drier 11 includes a desiccant 11a in the interior of the air drier 11. A non-return valve 12 is arranged in an outlet port 11c of the air drier 11. If the internal pressure of a main tank 18 is lower than or equal to a set pressure, the non-return valve 12 permits supply of dry compressed air from the air drier 11 to the main tank 18. When the internal pressure of the main tank 18 exceeds the set pressure, the non-return valve 12 stops the supply of dry compressed air from the air drier 11 to the main tank 18.

The air drier 11 also includes a drain port 11d, through which collected liquid, or oil and water produced by regenerating the desiccant 11a, is discharged. A drain valve device 13 is arranged in the drain port 11d. A drain pipe 17g is connected to the drain port 11d. The drain pipe 17g is connected to an oil separator (not shown), which separates the collected liquid and the air from each other and retains the oil and water. The oil separator is open to the atmospheric air.

The governor device 19 is connected to the drain valve device 13 through a line 17f. The governor device 19 is connected to the main tank 18 through a line 17e. The line 17e, which connects the governor device 19 and the main tank 18 together, branches off a line 17d, which connects the air drier 11 and the main tank 18 together. The line 17f, which connects the governor device 19 and the drain valve device 13 together, branches off the line 17c, which connects the governor device 19 and the turbo check valve 20 together. The main tank 18 is connected to an air system of the vehicle, such as a braking system or a suspension system.

When the governor device 19 does not operate the air system, the governor device 19 supplies dry compressed air from the main tank 18 to the compressor 10 through a line 19a, which is represented by the broken lines in FIG. 1. The compressor 10 is thus switched to a state of non-supplying compressed air to the air drier 11. When the governor device 19 stops supply of the dry compressed air to the compressor 10, the compressor 10 is operated. In a state in which the compressor 10 supplies compressed air to the air drier 11, if the internal pressure of the main tank 18 exceeds the set pressure, the governor device 19 delivers the dry compressed air in the main tank 18, as an air pressure signal, to the drain valve device 13 and the turbo check valve 20.

The air drier 11 performs a dehumidifying action (a loading mode operation), in which oil and water is removed from the compressed air, and a regenerating action (an unloading mode operation), in which the desiccant 11a is regenerated by removing the oil and water adsorbed by the desiccant 11a and releasing the oil and water to the exterior. In the loading mode operation, the turbo check valve 20 is in a state of allowing communication between the first port 26 and the second port 27. Meanwhile, the drain valve device 13 is closed and the non-return valve 12 is open. At this time, the compressed air delivered from the compressor 10 is dehumidified by flowing in from an inlet port 11b of the air drier 11 and passing through the desiccant 11a. The dry compressed air, which is the dehumidified compressed air, is discharged from an outlet port 11c of the air drier 11 and retained in the main tank 18.

Figure 2:
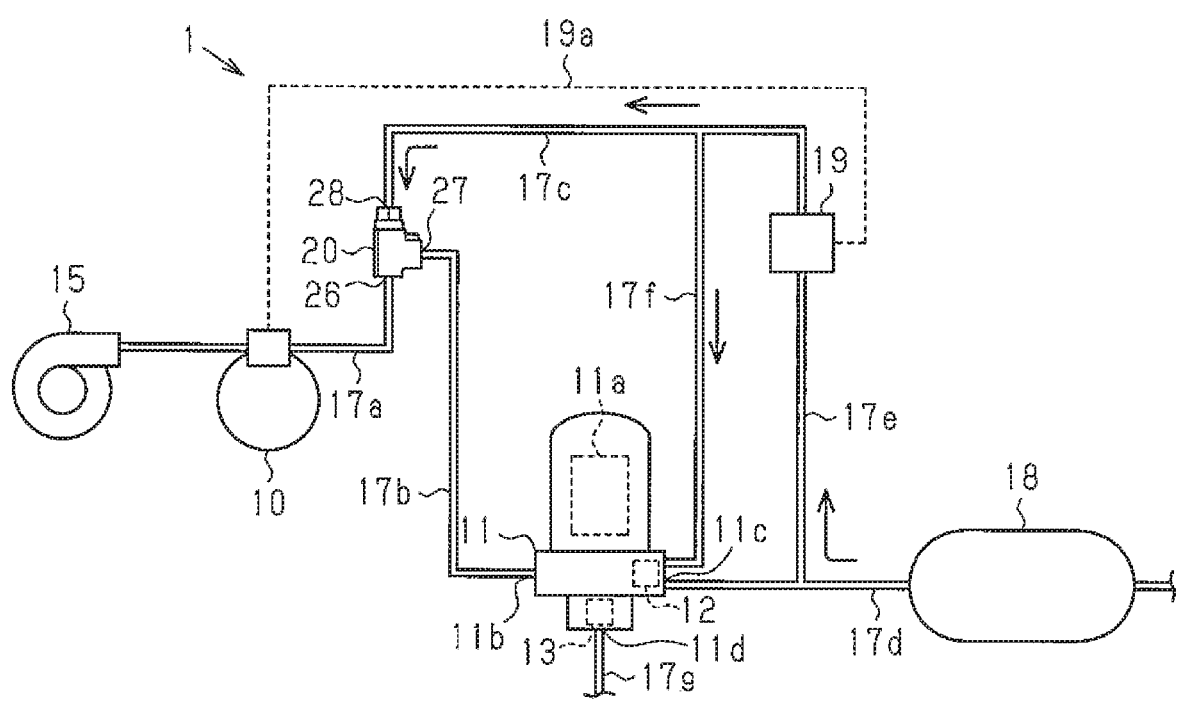
FIG. 2 is a block diagram representing the flow of compressed air in an unloading mode operation of the air drier of the compressed air drying system of FIG. 1.

With reference to FIG. 2, if the internal pressure of the main tank 18 exceeds the set pressure, the dry compressed air is delivered from the main tank 18 to the governor device 19 through the line 17e. At this time, the non-return valve 12 of the air drier 11 is closed to prohibit backflow of the dry compressed air from the main tank 18 into the air drier 11. The governor device 19 supplies the dry compressed air to the turbo check valve 20 through the line 17c to close the turbo check valve 20 using the air pressure. The turbo check valve 20 thus switches the first port 26 and the second port 27 to a non-communicating state. Meanwhile, the governor device 19 supplies the dry compressed air to the drain valve device 13 through the line 17f to open the drain valve device 13 using the air pressure. The time at which the turbo check valve 20 is closed either coincides with or is slightly advanced with respect to the time at which the drain valve device 13 is opened. By closing the turbo check valve 20 in this manner, the supply of compressed air from the compressor 10 to the air drier 11 is stopped. As a result, discharge of the compressed air, which is delivered from the compressor 10, into the atmospheric air through the drain valve device 13 is prevented. This prevents decrease of the forced-induction pressure of the forced-induction device.

The dry compressed air in the air drier 11 flows through the desiccant 11a in the direction opposite to that in the loading mode operation. In this manner, the oil and water adsorbed by the desiccant 11a is removed and flows, together with the dry compressed air, to the drain port 11d. Specifically, the air drier 11 may have a filter having fine pores through which air passes, which is a sponge, a compressed metal material, or a fibrous material. In the unloading mode operation, the oil and water adsorbed by the filter is also removed and discharged as the collected liquid.

The turbo check valve 20 will now be described with reference to FIGS. 3 to 7.

Figure 3:
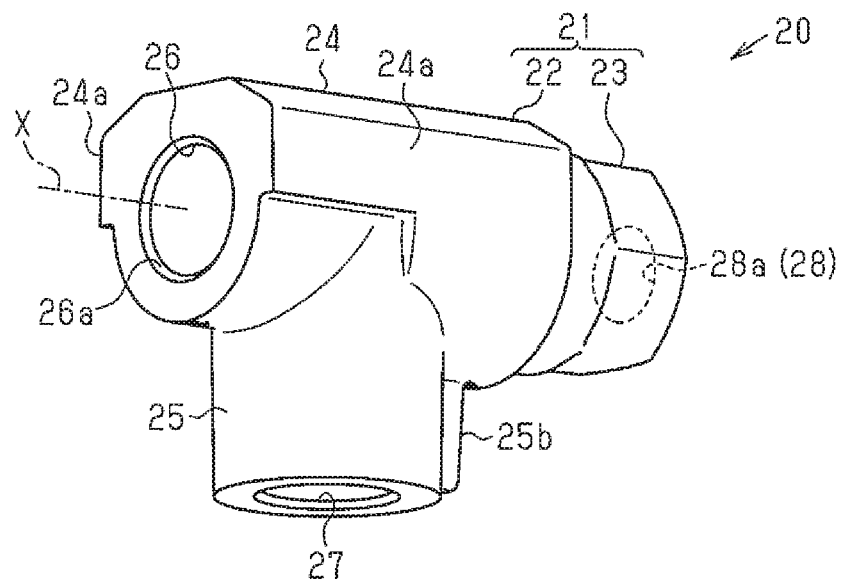
FIG. 3 is a perspective view showing a turbo check valve of FIG. 1 as viewed from the side corresponding to a first port.

As illustrated in FIG. 3, the turbo check valve 20 includes a body 21. The body 21 includes a first body member 22 and a second body member 23.

The first body member 22 and the second body member 23 are made of a heat-resistant and oil-resistant material. The first and second body members 22, 23 may be made of either the same material or different materials. For example, the first and second body members 22, 23 are made of metal such as aluminum, iron, or titanium or alloy containing multiple metal elements such as stainless steel or zinc cast iron. If the first and second body members 22, 23 are made of metal, the body members 22, 23 are formed by casting. Alternatively, the first and second body members 22, 23 are made of thermoplastic resin such as polybutylene terephthalate resin (PBT), polyphenylene sulfide resin (PPS), polyacetal plastic (POM), or nylon resin. If the first and second body members 22, 23 are made of plastic, the body members 22, 23 are formed by injection molding or the like.

The first body member 22 includes a first tubular section 24 and a second tubular section 25. The second tubular section 25 extends from a middle section of the first tubular section 24 in a direction perpendicular to the axis X of the first tubular section 24. The first port 26, which is connected to the compressor 10, is arranged in a first end of the first tubular section 24.

Two flat side surfaces 24a are arranged on an outer circumferential surface of the first tubular section 24. The side surfaces 24a are arranged at positions symmetrical with respect to the axis X of the first tubular section 24. The first tubular section 24 is thus easy to hold using a tool such as a wrench.

A first end of the second tubular section 25 is joined to the first tubular section 24. The second port 27, which is connected to the air drier 11, is arranged in a second end of the second tubular section 25.

Figure 4:
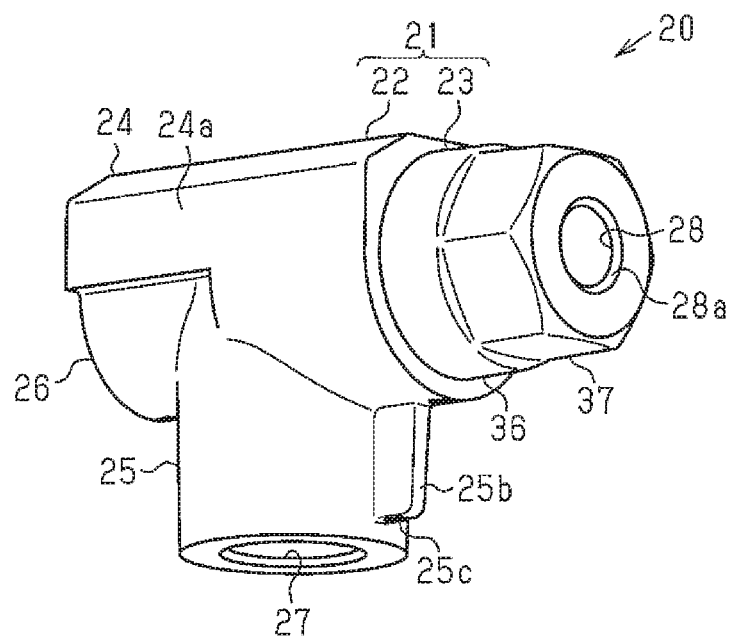
FIG. 4 is a perspective view showing the turbo check valve of FIG. 3 as viewed from the side corresponding to a third port.

As shown in FIG. 4, the second body member 23 is attached to a second end of the first tubular section 24. The second body member 23 includes the third port 28, which is connected to the governor device 19. The second body member 23 includes a cylindrical section 36 and a fastening portion 37, which is formed into a hexagonal tubular shape, and is attached in a state in which the cylindrical section 36 and the fastening portion 37 project from the first body member 22. Since the fastening portion 37 has the hexagonal shape, the fastening portion 37 is easy to hold using a tool such as a wrench.

The second tubular section 25 has a rib 25b, which projects from an outer circumferential surface of the second tubular section 25. A first end of the rib 25b is connected to the outer circumferential surface of the first tubular section 24. If the first and second body members 22, 23 are formed by casting, a port number can be projected from or engraved in the rib 25b by casting. In FIG. 4, a numerical display 25c is formed in a second end of the rib 25b. By arranging the rib 25b in the above-described, the numerical display 25c can be formed at such a position that interference by another component joined to the turbo check valve 20 does not happen. Also, a port number or the like can be printed at such a position that interference by a molding die does not happen at the time of removal from the die in manufacturing.

Figure 5:
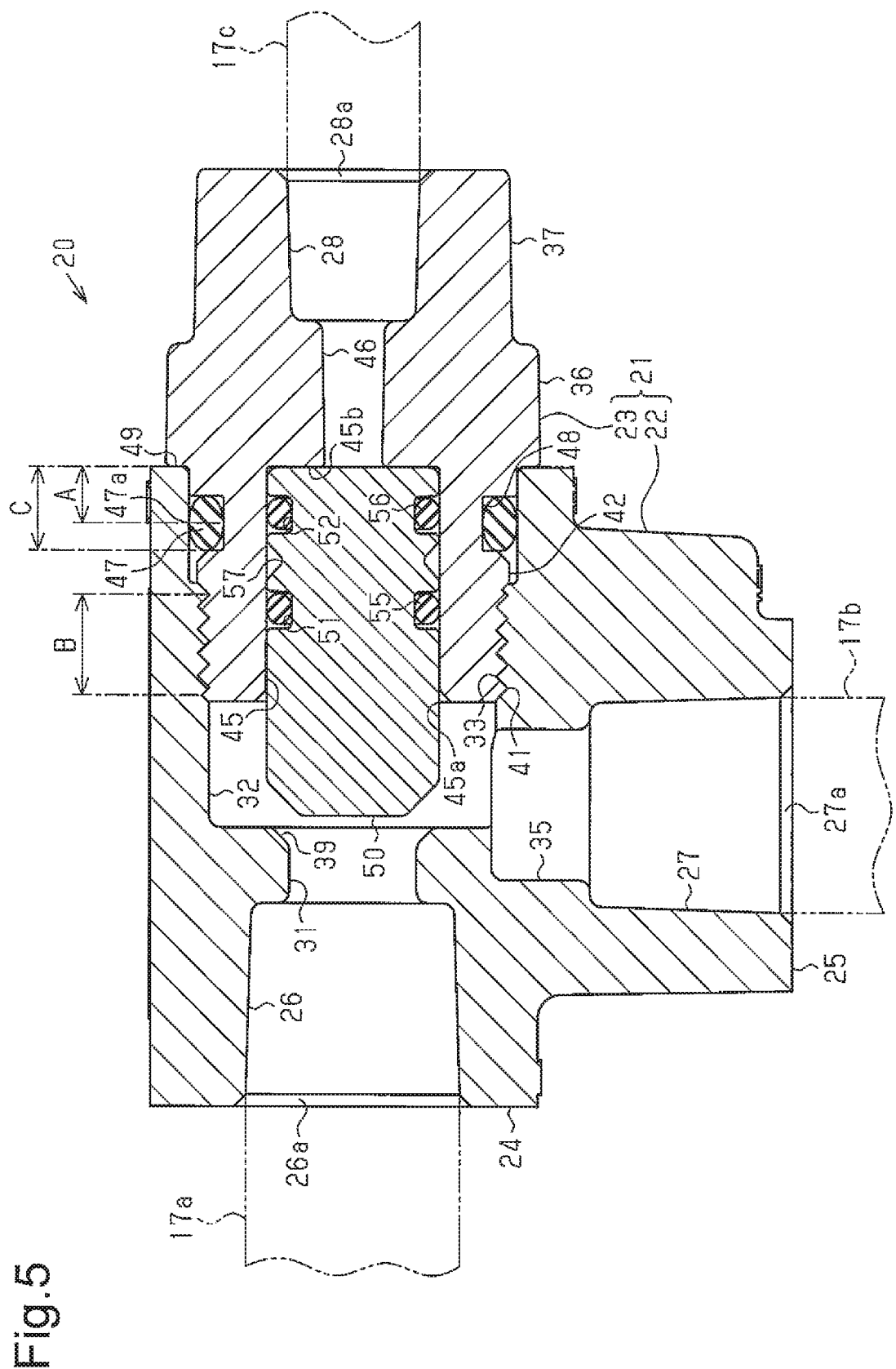
FIG. 5 is a cross-sectional view showing the turbo check valve of FIG. 3 in an open state.

With reference to FIG. 5, the first port 26, which is arranged in the first body member 22, and the third port 28, which is arranged in the second body member 23, extend parallel to each other. The second port 27, which is arranged in the first body member 22, extends in a direction perpendicular to the first port 26 and the third port 28. The first port 26 has a diameter that decreases from a port inlet 26a toward the second port 27. An end of the line 17a that is connected to the compressor 10 is received in the first port 26.

The first port 26 is connected to a passage 32 through a communication line 31. An internal thread 33, into which the second body member 23 is threaded, is formed in an inner circumferential surface of the passage 32. In the communication line 31, a valve seat 39 is arranged on the side corresponding to the passage 32.

The passage 32 is connected to the second port 27 through a communication line 35. The second port 27 has a diameter that decreases from a port inlet 27a toward the communication line 35. The line 17b, which is connected to the air drier 11, is received in the second port 27.

The third port 28, which is arranged in the second body member 23, has a diameter that decreases from a port inlet 28a toward the first port 26. The line 17c, which is connected to the governor device 19, is received in the third port 28. The second body member 23 has a threading portion 42 in which an external thread 41 is formed. A columnar receiving hole 45 is formed in the inner side of the threading portion 42. A columnar piston 50 is slidably arranged in the receiving hole 45. A communication hole 46, which is connected to the third port 28, is formed to extend through the cylindrical section 36. The second body member 23 and the piston 50 slidably contact each other and the second body member 23 functions as a slidable-contact portion.

A first annular groove 51 and a second annular groove 52 are formed in a first end of the piston 50 along the outer circumferential surface of the piston 50. A first sealing member 55 and a second sealing member 56 are received in the first annular groove 51 and the second annular groove 52, respectively.

The turbo check valve 20 is attached to the compressed air drying system 1 such that the piston 50 is located vertically above the first port 26 (see FIGS. 1 and 2). In other words, the third port 28 is located vertically above the first port 26. This restrains retaining of water and oil on the side corresponding to the sealing members 55, 56. Such water and oil is liquefaction product of the water and oil contained in the compressed air supplied from the compressor 10. As a result, swelling of the sealing members 55, 56 caused by the water and oil is restrained.

The first sealing member 55, which is arranged on the side corresponding to the line 17a connected to the compressor 10, is made of a heat-resistant and oil-resistant material such as nitrile rubber (NBR), which is copolymer of acrylonitrile and 1,3-butadiene, or fluorine contained rubber (FKM) polymerized with fluorine contained monomer. The first sealing member 55 may also be ozone resistant. The second sealing member 56 is made of a material different from the material of the first sealing member 55. The compressor 10 supplies high-temperature compressed air that contains oil and water through the line 17a. However, the first sealing member 55 is made of the heat-resistant and oil-resistant material and thus has improved durability. This restrains deterioration of the first sealing member 55. On the other hand, high-standard heat-resistance and oil-resistance are not demanded for the second sealing member 56 compared to the first sealing member 55. This decreases the requirements on the material of the second sealing member 56.

An oil retainer 57 is arranged in the outer circumferential surface of the piston 50 axially between the first annular groove 51 and the second annular groove 52. The oil retainer 57 is formed in a groove-like shape in the circumferential direction of the piston 50. By temporarily retaining lubricant oil, the oil retainer 57 prevents shortage of lubricant oil between the piston 50 and the second body member 23.

A seal groove 48 is formed circumferentially in an outer circumferential surface of the threading portion 42 of the second body member 23. An annular sealing component 47 is fitted around the threading portion 42 at the position corresponding to the seal groove 48. The second body member 23 is attached to the first body member 22 by inserting the threading portion 42 into the first body member 22 and threading the external thread 41 of the second body member 23 onto the internal thread 33 of the first body member 22. In a state in which the second body member 23 is attached to the first body member 22, a bottom surface of the cylindrical section 36 of the second body member 23 contacts a wall of an attachment port 49 of the first body member 22. The fitted sealing component 47 contacts and is thus compressed by the first body member 22 and seals the gap between the first body member 22 and the second body member 23 at a seal position 47a. The length of the section of the sealing component 47 from the seal position 47a to the attachment port 49 of the first body member 22 is defined as a first length A. The length of the section in which the external thread 41 and the internal thread 33 are threaded together is defined as a second length B. The first length A is shorter than the second length B. Also, the second length B, by which the internal thread 33 and the external thread 41 are threaded together, is longer than a third length C from the end face of the seal groove 48 of the second body member 23 on the side corresponding to the external thread 41 to the attachment port 49 of the first body member 22. The third length C is longer than the first length A.

The piston 50 is made of a material having hardness different from the hardness of the material of the second body member 23. The combination of the material of the second body member 23 and the material of the piston 50 may be, for example, a combination of metals having different hardnesses, such as aluminum (hardness: low) and iron (hardness: high), or a combination of different types of materials, such as plastic such as POM (hardness: low) and metal (hardness: high), or a combination of plastics having different hardnesses, such as PPS (hardness: low) and glass fiber contained PBT (hardness: high).

The piston 50 may be made of a material having either higher or lower hardness than the hardness of the material of the second body member 23. For example, if the hardness of the material of the second body member 23 is lower than the hardness of the material of the piston 50, the second body member 23 becomes worn to match the shape of the piston 50. For example, the range of the inner circumferential surface of the second body member 23 that slides on the bottom of the oil retainer 57, on which stress is concentrated, becomes worn in a groove-like shape in the sliding direction. If the hardness of the material of the piston 50 is lower than the hardness of the material of the second body member 23, the section of the piston 50 that slides on a corner section 45a of the receiving hole 45, on which stress caused by the second body member 23 is likely to be concentrated, becomes worn. As a result, such wear progresses such that, despite the wear, the piston 50 and the second body member 23 have shapes to be engaged with each other through lubricant oil. A great gap is thus unlikely to be formed between the piston 50 and the second body member 23. This prolongs the period in which the sealing performance between the piston 50 and the second body member 23 is maintained, compared to a case in which the piston 50 and the second body member 23 are made of the same material.

Next, the operation of the turbo check valve 20 will be described with reference to FIGS. 5 to 7.

With reference to FIG. 5, in a state in which compressed air is supplied from the compressor 10 to the air drier 11, if the internal pressure of the main tank 18 is lower than or equal to the set pressure, the drain valve device 13 of the air drier 11 is closed. Also, as the compressed air flows in through the first port 26, the pressure of the compressed air is applied to the one on the side corresponding to the valve seat 39 of the side surfaces of the piston 50 perpendicular to the axis of the piston 50. Thus, the end of the piston 50 adjacent to the valve seat 39 separates from the valve seat 39 and a second end of the piston 50 is brought into contact with an end face 45b of the receiving hole 45. The first port 26 and the second port 27 are now in an open state and the third port 28 is in a closed state. As has been described, since the first port 26 is connected to the compressor 10, the outer circumferential surface of the piston 50 does not receive the pressure of the compressed air. This minimizes displacement of the axis of the piston 50 and the axis of the valve seat 39 from each other. By reducing such displacement of the axes, damage to at least one of the valve seat 39 and the piston 50 at the time the piston 50 contacts the valve seat 39 is minimized. Air leakage caused by such damage is thus minimized.

The compressed air is supplied from the compressor 10 to the air drier 11 through the turbo check valve 20. The dry compressed air that has been dehumidified by the air drier 11 is retained in the main tank 18. The dry compressed air that is retained in the main tank 18 is used to operate the air system.

Figure 6:
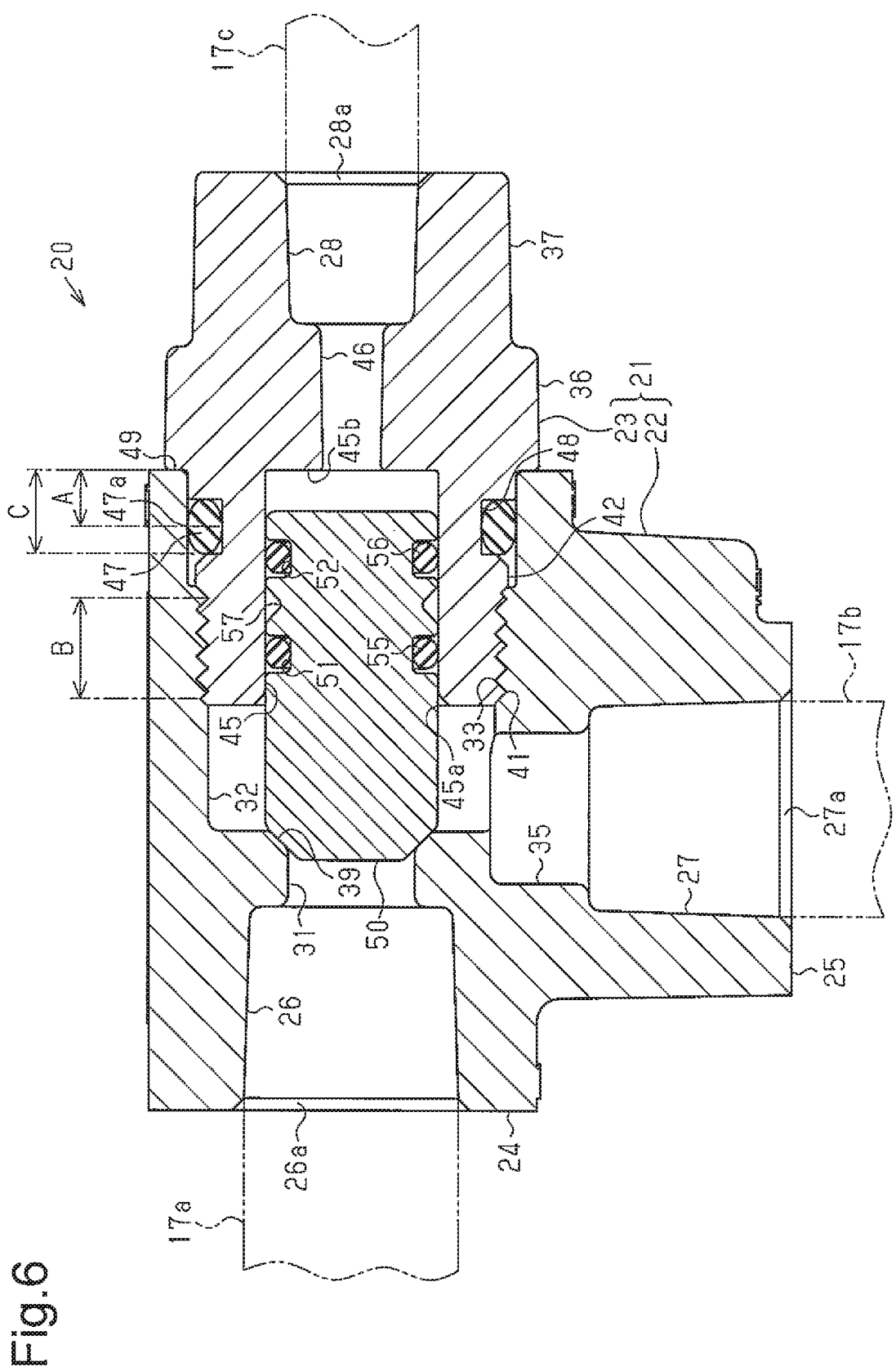
FIG. 6 is a cross-sectional view showing the turbo check valve of FIG. 3 in a closed state.

As illustrated in FIG. 6, when the internal pressure of the main tank 18 exceeds the set pressure, the dry compressed air is supplied from the governor device 19 to the third port 28. Meanwhile, the dry compressed air is supplied from the governor device 19 to the drain valve device 13 of the air drier 11, thus opening the drain valve device 13.

The pressure of the dry compressed air supplied to the third port 28 causes the piston 50 of the turbo check valve 20 to slide in the receiving hole 45 toward the first port 26. The corresponding end of the piston 50 thus contacts the valve seat 39, thus closing the first port 26 and the second port 27.

The first sealing member 55, which is arranged in the piston 50, is arranged on the side corresponding to the first port 26 with respect to the second sealing member 56. The first sealing member 55 is thus exposed to high temperature and the oil and water contained in the compressed air. However, since the first sealing member 55 is made of a heat-resistant and oil-resistant material, deterioration of the first sealing member 55 is restrained.

Also, the piston 50 has both the first sealing member 55 and the second sealing member 56. As a result, if one of the sealing members is deteriorated but the other one is not, the non-deteriorated sealing member ensures an adequate sealing performance between the first body member 22 and the second body member 23.

The maintenance work for the turbo check valve 20 will hereafter be described. At the time of such maintenance, the sealing component 47 of the second body member 23 and the first and second sealing members 55, 56 of the piston 50 may be replaced. At this time, the second body member 23 must be detached from the first body member 22. However, the compressed air is maintained in the first body member 22. Therefore, in a conventional turbo check valve 20, if the second body member 23 is simply detached from the first body member 22, the second body member 23 may jump out of the first body member 22. This necessitates additional work for releasing the compressed air, such as detaching the line 17a, which is connected to the compressor 10, from the first body member 22.

As has been described, the turbo check valve 20 is configured such that the first length A from the seal position 47a of the sealing component 47 to the attachment port 49 of the first body member 22 is shorter than the second length B by which the internal thread 33 of the first body member 22 and the external thread 41 of the second body member 23 are threaded together.

Figure 7:
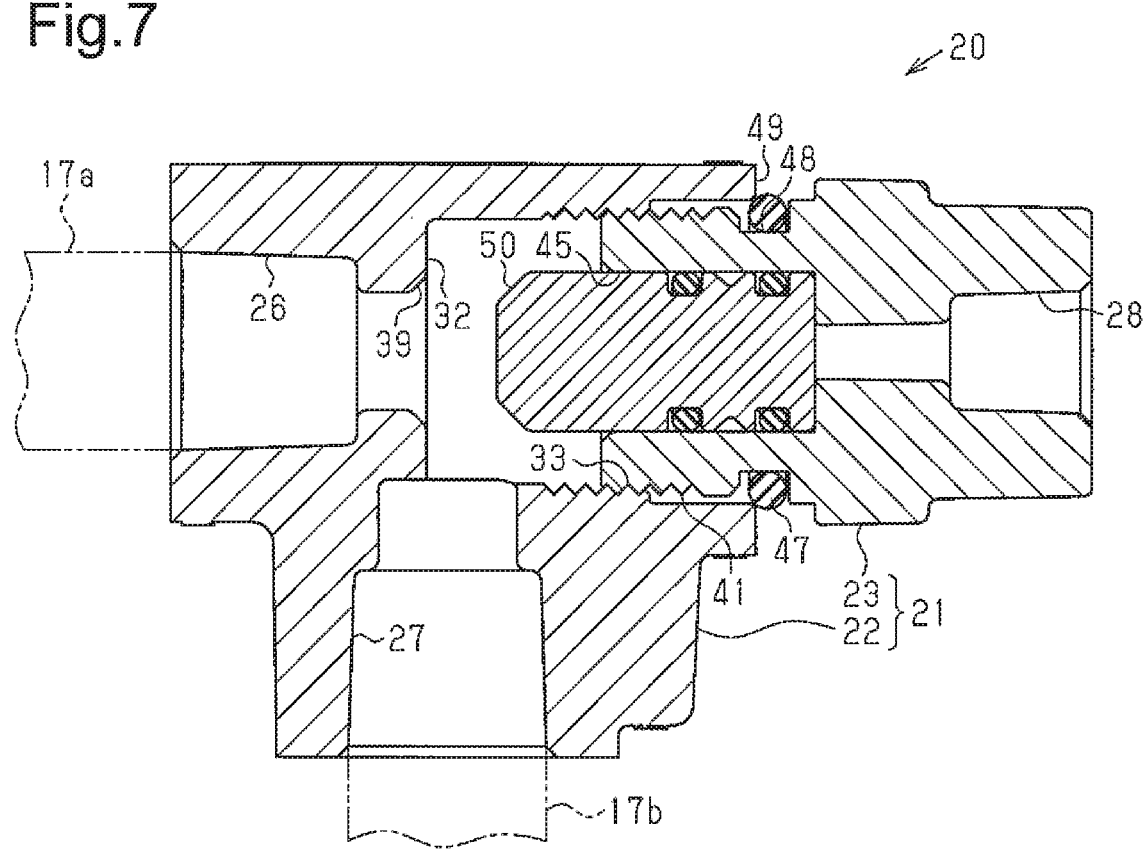
FIG. 7 is a cross-sectional view showing the turbo check valve of FIG. 3 in a transient state in detachment of a second body member from a first body member.

As a result, as illustrated in FIG. 7, by unthreading the second body member 23 from the first body member 22 while rotating the second body member 23 relative to the first body member 22 until the seal position 47a of the sealing component 47 (see FIG. 5 or 6) moves past the attachment port 49 of the first body member 22, the compressed air in the first body member 22 is released through the gap between the second body member 23 and the first body member 22. This eliminates the need for releasing the compressed air from the first body member 22, such as detaching the line 17a, which is connected to the compressor 10, from the first body member 22. Thus, the work efficiency at the time of detachment of the second body member is improved.

As described above, the present embodiment achieves the following advantages.

(1) The piston 50 and the second body member 23, which slides on the piston 50, are made of materials having different hardnesses. As a result, if the hardness of the material of the second body member 23 is lower than the hardness of the material of the piston 50, the second body member 23 becomes worn to match the shape of the piston 50. If the hardness of the material of the piston 50 is lower than the hardness of the material of the second body member 23, the piston 50 becomes worn to match the shape of the second body member 23. This prolongs the period in which the sealing performance between the piston 50 and the second body member 23 is maintained, compared to a case in which the piston 50 and the second body member 23 are made of the same material. The durability of the turbo check valve 20, which is connected to the compressor 10, is thus improved.

(2) The second body member 23, which slides on the piston 50, is arranged independently of the first body member 22. The second body member 23 can thus be made of a material having hardness different from the hardness of the material of the piston 50 by changing the material of the second body member 23, without changing the material of the body 21 as a whole. Also, the second body member 23 is configured to be threaded to the first body member 22. The second body member 23 is thus easily detached and attached at the time of maintenance.

(3) At the time of maintenance, high-pressure compressed air is maintained in the turbo check valve 20 and the line 17a, which is connected to the turbo check valve 20. The pressure of the compressed air is thus applied to the second body member 23. In the above-described embodiment, the first length A from the attachment port 49 to the seal position 47a of the sealing component 47 is shorter than the second length B of the section in which the internal thread 33 and the external thread 41 are threaded together. Therefore, to detach the second body member 23 from the attachment port 49, the sealing by the sealing component 47 is canceled before the second body member 23 is unthreaded, thus discharging the compressed air from the gap between the first body member 22 and the second body member 23. The second body member 23 is thus not pressed out by the compressed air after having been unthreaded. The work efficiency at the time of detaching the second body member 23 is thus improved.

(4) The first sealing member 55 and the second sealing member 56 are arranged between the piston 50 and the first body member 22. As a result, if compressed air leaks through one of the sealing members but the other one is not deteriorated, the non-deteriorated sealing member prevents leakage of the compressed air. This improves the durability of the turbo check valve 20, which is connected to the compressor 10.

(5) The first sealing member 55, which is arranged at a position closer to the side corresponding to the first port 26 connected to the compressor 10 than the second sealing member 56, is exposed to the most severe environment. In the above-described embodiment, the first sealing member 55 is made of a material having oil-resistance and heat-resistance higher than those of the material of the second sealing member 56. The durability of the first sealing member 55 is thus improved. Also, the second sealing member 56 can be made of a material different from the material of the first sealing member 55, which has enhanced oil-resistance and heat-resistance. This decreases limitations of the material of the second sealing member 56.

Second Embodiment

An air drying system according to a second embodiment will now be described with reference to FIGS. 8 to 12. The compressed air drying system is mounted in an automobile such as a truck, a bus, and a construction machine.

Conventionally, in a compressed air drying system, if the inlet port of an air drier 111 is open in the unloading mode operation of the air drier, the compressed air that has flowed in through the inlet port is discharged from a drain valve device, which is open, into the atmospheric air disadvantageously. That is, the compressed air is discharged into the atmospheric air through the air drier. Therefore, arranging a check valve (an inlet port opening/closing device) in the air drier has been proposed by which the inlet port and outlet port of the air drier are opened in the loading mode operation and closed in the unloading mode operation.

As has been described, high-pressure and high-temperature compressed air containing oil flows into the inlet port of the check valve connected to the compressor. Therefore, to tolerate such severe conditions, an improved sealing performance is demanded for the check valve at the time the check valve is closed. This problem is generally common not only to vehicles but also to devices in which a compressed air drying system, which is connected to a compressor and purifies compressed air, is mounted.

Figure 8:
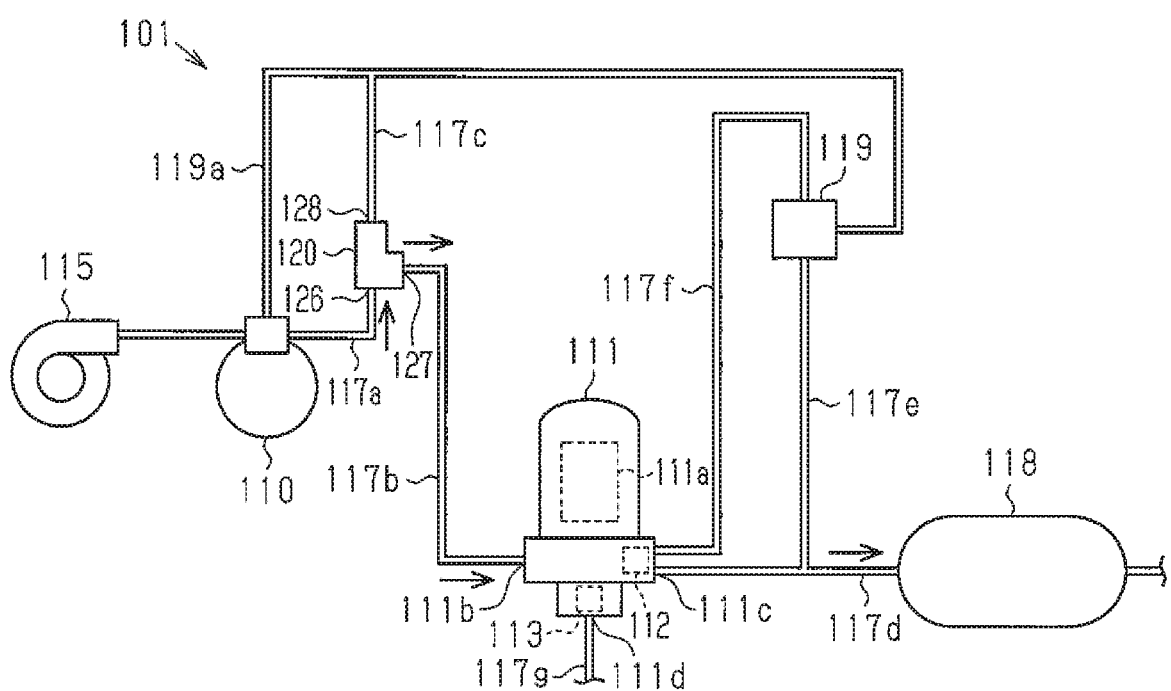
FIG. 8 is a block diagram representing the flow of compressed air in a loading mode operation of an air drier in a second embodiment of a compressed air drying system.

Referring to FIG. 8, a compressed air drying system 101 is connected to the downstream side of a forced-induction device 115, which is connected to an internal combustion engine. The compressed air drying system 101 includes a compressor 110, the air drier 111 serving as a removal device, and a governor device 119 serving as a pressure regulating device. The compressed air drying system 101 removes oil and water from the compressed air delivered from the compressor 110, which is connected to the forced-induction device 115, by means of the air drier 111. The compressed air drying system 101 then retains the dry compressed air in a tank 118 and supplies the dry compressed air from the tank 118 to systems such as the brakes or the suspension. The amount of compression required by the compressor 110 is small since the air that is being received has been compressed by the forced-induction device 115. The size of the compressor 110 is thus reduced compared to a compressor that is mounted in a vehicle that either lacks something like the forced-induction device 115 or is not supplied with compressed air from something like a forced-induction device 115.

The compressor 110 is connected to a check valve 120 through a line 117a. The check valve 120 has a first port 126, a second port 127, and a third port 128. The first port 126 is connected to the compressor 110 through the line 117a. The second port 127 is connected to the air drier 111 through a line 117b. The third port 128 is connected to the governor device 119 through a line 117c and a line 119a, which is a connection pipe that connects the compressor 110 and the governor device 119 together. The line 119a is a connection pipe to which compressed air is delivered as an air pressure signal that is output to the compressor 110 to represent the unloading mode operation.

The air drier 111 includes desiccant 111a in the interior of the air drier 111. A non-return valve 112 is arranged in an outlet port 111c of the air drier 111. If the internal pressure of the tank 118 is lower than or equal to a set pressure, the non-return valve 112 permits supply of dry compressed air from the air drier 111 to the tank 118. When the internal pressure of the tank 118 exceeds the set pressure, the non-return valve 112 stops the supply of dry compressed air from the air drier 111 to the tank 118.

The air drier 111 also includes a drain port 111d, through which collected liquid, such as oil and water that is produced through regeneration of the desiccant 111a, is discharged. A drain valve device 113 is arranged in the drain port 111d. A drain pipe 117g is connected to the drain port 111d. The drain pipe 117g is connected to an oil separator (not shown), which separates the collected liquid and the air from each other and retains the oil and water. The oil separator is open to the atmospheric air.

The governor device 119 is connected to the drain valve device 113 through a line 117f. The governor device 119 is connected to the tank 118 through a line 117e. The line 117e, which connects the governor device 119 and the tank 118 together, branches off a line 117d, which connects the air drier 111 and the tank 118 together. The tank 118 is connected to an air system of the vehicle, such as the braking system or the suspension system.

When the air system is not operated, in other words, when the supply from the compressor 110 to the tank 118 is not performed, the governor device 119 supplies dry compressed air from the tank 118 to the compressor 110 through a line 119a. The compressor 110 is thus switched to a state of non-supplying compressed air to the air drier 111. When the governor device 119 stops supply of the dry compressed air to the compressor 110, the compressor 110 is switched to a state of supplying compressed air to the air drier 111. In a state in which the compressor 110 supplies compressed air to the air drier 111, if the internal pressure of the tank 118 exceeds the set pressure, the governor device 119 delivers the dry compressed air from the tank 118 to the compressor 110, the drain valve device 113, and the check valve 120 as an air pressure signal.

The air drier 111 performs a dehumidifying action (a loading mode operation), in which oil and water is removed from the compressed air, and a regenerating action (an unloading mode operation), in which the desiccant 111a is regenerated by removing the oil and water adsorbed by the desiccant 111a and releasing the oil and water to the exterior. In the loading mode operation, the check valve 120 is in a state of allowing communication between the first port 126 and the second port 127. Meanwhile, the drain valve device 113 is closed and the non-return valve 112 is open. At this time, the compressed air delivered from the compressor 110 is dehumidified by flowing in from an inlet port 111b of the air drier 111 and passing through the desiccant 111a. The dry compressed air, which is the dehumidified compressed air, is discharged from an outlet port 111c of the air drier 111 and retained in the tank 118.

Figure 9:
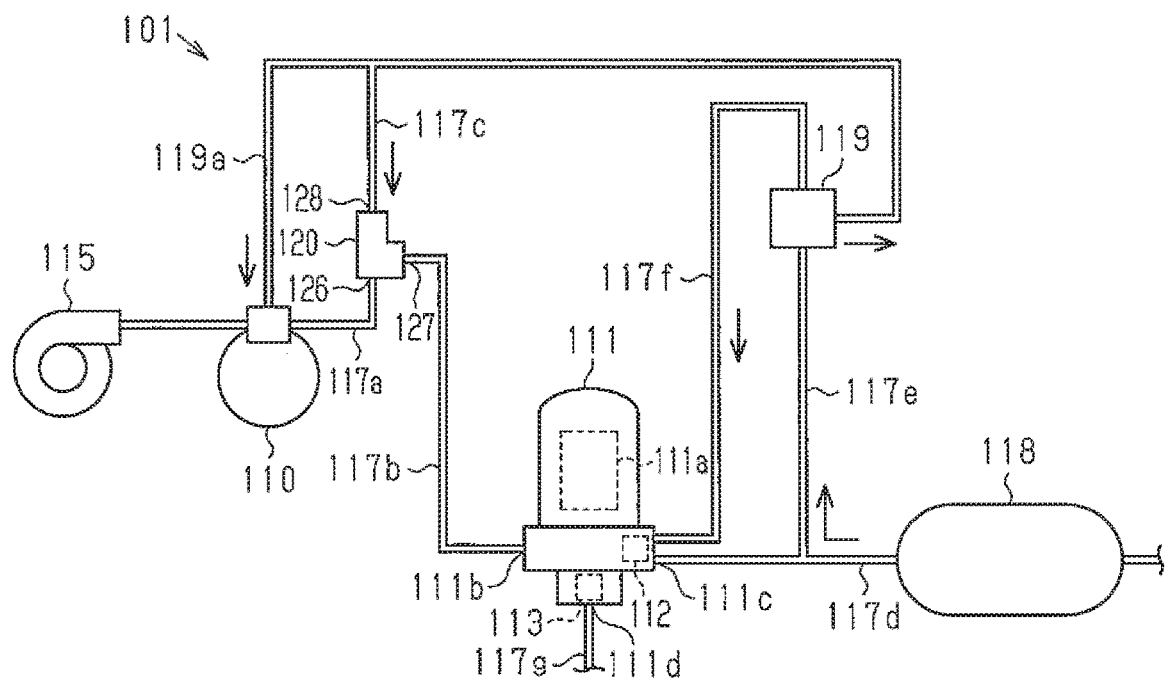
FIG. 9 is a block diagram representing the flow of compressed air in an unloading mode operation of the air drier of the compressed air drying system of FIG. 8.

Referring to FIG. 9, if the internal pressure of the tank 118 exceeds the set pressure, the dry compressed air is delivered from the tank 118 to the governor device 119 through the line 117e. At this time, the non-return valve 112 of the air drier 111 is closed to prohibit backflow of the dry compressed air from the tank 118 into the air drier 111. The governor device 119 supplies the dry compressed air to the check valve 120 through the line 119a and the line 117c to close the check valve 120 using the air pressure. The check valve 120 thus switches the first port 126 and the second port 127 to a non-communicating state. Meanwhile, the governor device 119 supplies the dry compressed air to the drain valve device 113 through the line 117f to open the drain valve device 113 using the air pressure. It is preferable that the time at which the check valve 120 is closed either coincide with or be slightly advanced with respect to the time at which the drain valve device 113 is opened. By closing the check valve 120 in this manner, the supply of compressed air from the compressor 110 to the air drier 111 is stopped. As a result, discharge of the compressed air, which is delivered from the compressor 110, into the atmospheric air through the drain valve device 113 is prevented. This prevents a decrease of the forced-induction pressure of the forced-induction device 115.

The dry compressed air in the air drier 111 flows through the desiccant 111a in the direction opposite to that in the loading mode operation. In this manner, the oil and water adsorbed by the desiccant 111a is removed and flows, together with the dry compressed air, to the drain port 111d. Specifically, the air drier 111 may have a filter having fine pores through which air passes, such as a sponge, a compressed metal material, or a fibrous material. In the unloading mode operation, the oil and water adsorbed by the filter of the air drier 111 is also removed and discharged from the air drier 111 as collected liquid.

The check valve 120 will hereafter be described in detail with reference to FIGS. 10 to 12.

Figure 10:
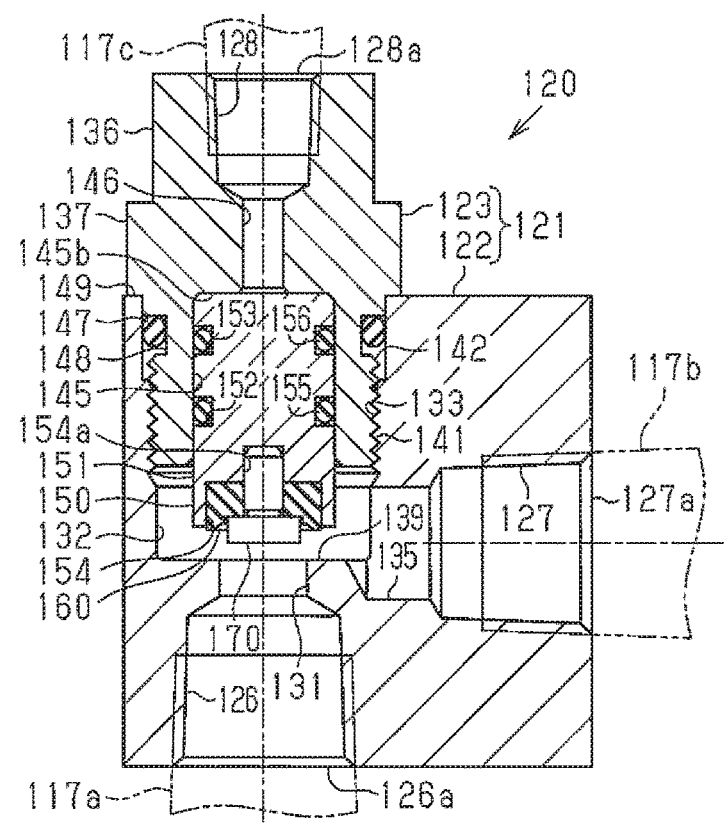
FIG. 10 is a cross-sectional view showing a check valve of FIG. 8 in an open state.
Figure 12:
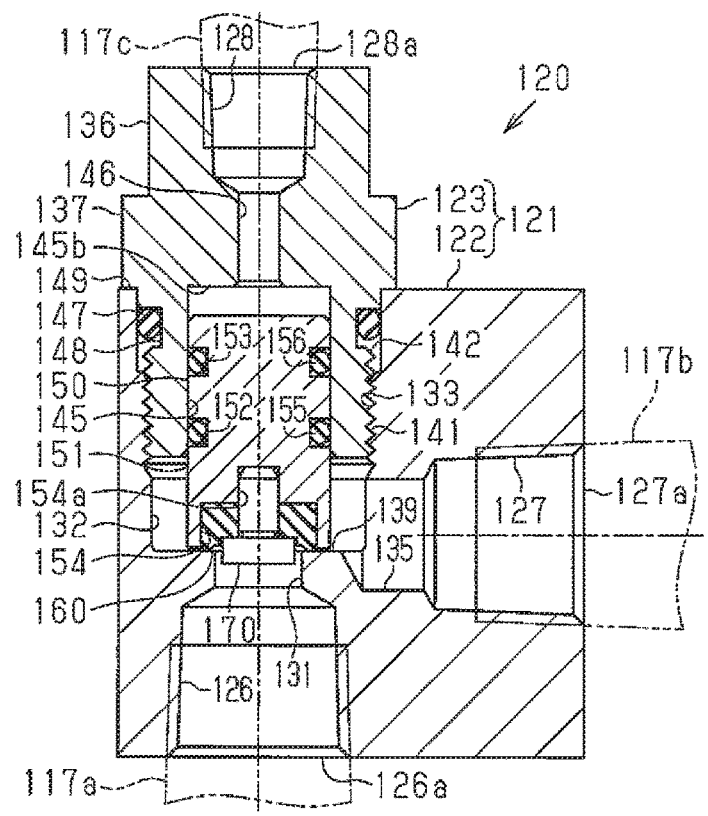
FIG. 12 is a cross-sectional view showing the check valve of FIG. 8 in a closed state.

As illustrated in FIGS. 10 and 12, the check valve 120 includes a body 121. The body 121 includes a first body member 122 and a second body member 123.

The first body member 122 and the second body member 123 are made of a heat-resistant and oil-resistant material. The first and second body members 122, 123 may be made of either the same material or different materials. For example, the first and second body members 122, 123 are made of metal such as aluminum, iron, or titanium or alloy containing multiple metal elements such as stainless steel or zinc cast iron. If the first and second body members 122, 123 are made of metal, the body members 122, 123 are formed by casting. Alternatively, the first and second body members 122, 123 are made of thermoplastic resin such as polybutylene terephthalate resin (PBT), polyphenylene sulfide resin (PPS), polyacetal resin (POM), or nylon resin. If the first and second body members 122, 123 are made of plastic, the body members 122, 123 are formed by injection molding or the like.

The first body member 122 is shaped like a rectangular parallelepiped. The first port 126, which is connected to the compressor 110, and the second port 127, which is connected to the air drier 111, are each arranged in a corresponding one of two perpendicular surfaces of the first body member 122.

The second body member 123 is attached to the side opposite to the first port 126 of the first body member 122. The second body member 123 includes the third port 128, which is connected to the governor device 119. The second body member 123 includes a cylindrical section 136 and a fastening portion 137, which is formed in a hexagonal tubular shape, and is attached in a state in which the cylindrical section 136 and the fastening portion 137 project from the first body member 122. Since the fastening portion 137 has a hexagonal shape, the fastening portion 137 is easy to hold using a tool such as a wrench.

The first port 126, which is arranged in the first body member 122, and the third port 128, which is arranged in the second body member 123, extend on the same line. The second port 127, which is arranged in the first body member 122, extends in a direction perpendicular to the first port 126 and the third port 128. The first port 126 has a diameter that decreases from a port inlet 126a toward the second port 127. An end of the line 117a, which is connected to the compressor 110, is received in the first port 26.

The first port 126 is connected to a passage 132 through a communication line 131. An internal thread 133, onto which the second body member 123 is threaded, is formed in an inner circumferential surface of the passage 132. In the communication line 131, a valve seat 139 is arranged on the side corresponding to the passage 132.

The passage 132 is connected to the second port 127 through a communication line 135. The second port 127 has a diameter that decreases from a port inlet 127a toward the communication line 135. The line 117b, which is connected to the air drier 111, is received in the second port 127.

The third port 128, which is arranged in the second body member 123, has a diameter that decreases from a port inlet 128a toward the first port 126. The line 117c, which is connected to the governor device 119, is received in the third port 128. The second body member 123 includes a threading portion 142 in which an external thread 141 is formed. A columnar receiving hole 145 is formed in the inner side of the threading portion 142. A columnar piston 150 is slidably arranged in the receiving hole 145. A communication hole 146, which is connected to the third port 128, is formed to extend through the cylindrical section 136. The second body member 123 and the piston 150 slidably contact each other and the second body member 123 has a slidable-contact portion.

Figure 11:
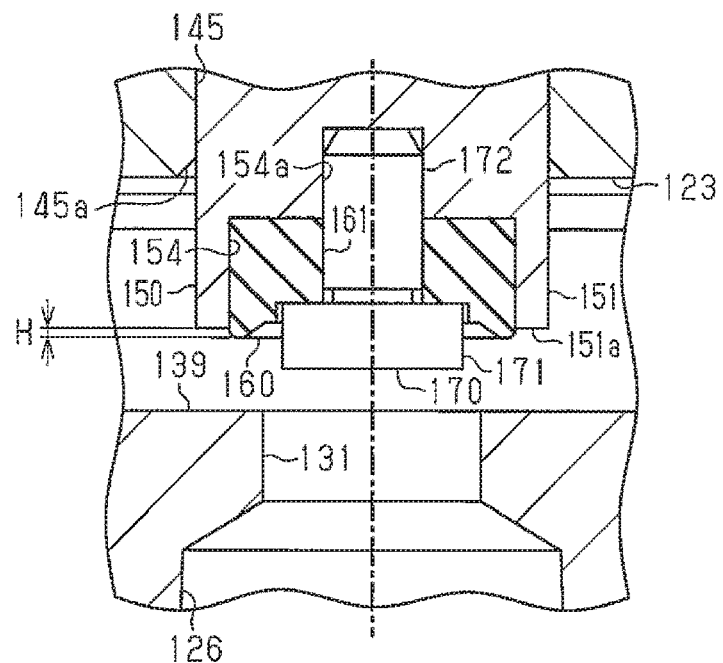
FIG. 11 is an enlarged cross-sectional view showing the check valve of FIG. 8 in the open state.

As illustrated in FIG. 11, the piston 150 includes a contact member 160, which contacts the valve seat 139 of the first body member 122, a slidable-contact member 151, which slidably contacts the second body member 123, and a pin 170, which fixes the contact member 160 to the slidable-contact member 151. The contact member 160 has a columnar shape. A through-hole 161, through which the pin 170 extends, is formed in the middle of the contact member 160. The slidable-contact member 151 has a columnar shape. An outer circumferential surface of the slidable-contact member 151 slidably contacts the slidable-contact portion of the second body member 123. An accommodating portion 154, which has columnar space for accommodating the contact member 160, is arranged in an end of the slidable-contact member 151 on the side corresponding to the valve seat 139. The outer diameter of the contact member 160 is set slightly greater than the inner diameter of the accommodating portion 154 of the slidable-contact member 151. The contact member 160 is thus pressed-fitted to the accommodating portion 154 by being pressed into the accommodating portion 154. The pin 170 has a flat portion 171, which has a flat plate-like shape, and a columnar portion 172, which has a columnar shape. A fixing hole 154a, which fixes the pin 170, is arranged in the middle of the bottom section of the accommodating portion 154. The outer diameter of the columnar portion 172 of the pin 170 is set slightly greater than the inner diameter of the fixing hole 154a. The pin 170 is thus pressed-fitted to the fixing hole 154a by being pressed into the fixing hole 154a.

The distal end of the contact member 160 on the side corresponding to the valve seat 139 is projected with respect to the distal end of the slidable-contact member 151 on the side corresponding to the valve seat 139. When the piston 150 is seated on the valve seat 139, the contact member 160 contacts the valve seat 139. A support portion 151a, which supports the outer periphery of the contact member 160, is arranged at the distal end of the slidable-contact member 151. The projecting amount H of the contact member 160 from the distal end of the slidable-contact member 151 is set such that the contact member 160 is not deformed excessively. This restrains excessive deformation of the contact member 160. If the contact member 160 is deformed by an amount exceeding the projecting amount H, the slidable-contact member 151 contacts the valve seat 139 to prevent excessive deformation that leads to sagging of the contact member 160. Although the distal end of the pin 170 on the side corresponding to the valve seat 139 is projected with respect to the distal end of the contact member 160, the outer diameter of the flat portion 171 of the pin 170 is smaller than the inner diameter of the communication line 131. The pin 170 thus does not project into the communication line 131 to contact the valve seat 139.

The contact member 160 is made of a heat-resistant and oil-resistant material such as nitrile rubber (NBR), which is copolymer of acrylonitrile and 1,3-butadiene, or fluorine contained rubber (FKM) polymerized with fluorine contained monomer. Further, the contact member 160 may be ozone resistant.

With reference to FIGS. 10 and 12, a first annular groove 152 and a second annular groove 153 are formed in an outer circumferential surface of the piston 150 on the side corresponding to the third port 128. A first sealing member 155 and a second sealing member 156 are received in the first annular groove 152 and the second annular groove 153, respectively.

The check valve 120 is attached to the compressed air drying system 101 such that the piston 150 is located vertically above the first port 126 (see FIGS. 1 and 2). In other words, the third port 128 is located vertically above the first port 126. This restrains retaining of water and oil on the side corresponding to the sealing members 155, 156. Such water and oil is a liquefaction product of the water and oil contained in the compressed air supplied from the compressor 110. As a result, swelling of the sealing members 155, 156 caused by the water and oil is reduced.

The first sealing member 155, which is arranged on the side corresponding to the line 117a connected to the compressor 110, is made of a heat-resistant and oil-resistant material such as NBR or FKM. The first sealing member 155 may also be ozone resistant. The second sealing member 156 is made of a material different from the material of the first sealing member 155. The compressor 110 supplies high-temperature compressed air, which contains oil and water, through the line 117a. However, the first sealing member 155 is made of the heat-resistant and oil-resistant material and thus has an improved durability. This reduces deterioration of the first sealing member 155. On the other hand, high-standard heat-resistance and oil-resistance are not demanded for the second sealing member 156 compared to the first sealing member 155. This minimizes the requirements of the material of the second sealing member 156.

A seal groove 148 is formed circumferentially in an outer circumferential surface of the threading portion 142 of the second body member 123. An annular sealing component 147 is fitted around in the threading portion 142 at the position corresponding to the seal groove 148. The second body member 123 is attached to the first body member 122 by inserting the threading portion 142 into the first body member 122 and threading the external thread 141 of the second body member 123 onto the internal thread 133 of the first body member 122. In a state in which the second body member 123 is attached to the first body member 122, the bottom surface of the cylindrical section 136 of the second body member 123 contacts a wall of an attachment port 149 of the first body member 122.

The slidable-contact member 151 of the piston 150 is made of a material having hardness different from the hardness of the material of the second body member 123. The combination of the material of the second body member 123 and the material of the slidable-contact member 151 of the piston 150 may be, for example, a combination of metals having different hardnesses, such as aluminum (hardness: low) and iron (hardness: high), or a combination of different types of materials, such as plastic such as POM (hardness: low) and metal (hardness: high), or a combination of plastics having different hardnesses, such as PPS (hardness: low) and glass fiber contained PBT (hardness: high).

The slidable-contact member 151 of the piston 150 may be made of a material having either higher or lower hardness than the hardness of the material of the second body member 123. For example, if the hardness of the material of the second body member 123 is lower than the hardness of the material of the slidable-contact member 151 of the piston 150, the second body member 123 becomes worn to match the shape of the slidable-contact member 151 of the piston 150. If the hardness of the material of the slidable-contact member 151 of the piston 150 is lower than the hardness of the material of the second body member 123, the section of the slidable-contact member 151 of the piston 150 that slides on a corner section 145a of the receiving hole 145, on which stress caused by the second body member 123 is likely to be concentrated, becomes worn. As a result, such wear progresses such that, despite the wear, the slidable-contact member 151 of the piston 150 and the second body member 123 have shapes to be engaged with each other through lubricant oil. A great gap is thus unlikely to be formed between the slidable-contact member 151 of the piston 150 and the second body member 123. This prolongs the period in which the sealing performance between the slidable-contact member 151 of the piston 150 and the second body member 123 is maintained, compared to a case in which the slidable-contact member 151 of the piston 150 and the second body member 123 are made of the same material.

Specifically, in the configuration of FIGS. 10 to 12, the surface area of the pressure receiving surface of the piston 150 on the side corresponding to an end face 145b is equal to the surface area of the pressure receiving surface of the piston 150 on the side corresponding to the valve seat 139. Also, after the governor device 119 is opened by sliding resistance of the sealing members 155, 156, the pressure of the piston 150 on the side corresponding to the valve seat 139 slightly decreases before the check valve 120 is closed. Even in this configuration, by closing the check valve 120, supply of the compressed air from the compressor 110 to the air drier 111 is prevented. This prevents discharge of the compressed air, which is delivered from the compressor 110, into the atmospheric air through the drain valve device 113. If the surface area of the pressure receiving surface of the piston 150 on the side corresponding to the end face 145b is greater than the surface area of the pressure receiving surface of the piston 150 on the side corresponding to the valve seat 139, the check valve 120 is closed immediately after the governor device 119 is opened.

The operation of the compressed air drying system 101 and the check valve 120 will now be described with reference to FIGS. 10 to 12.

Referring to FIG. 10, in a state in which compressed air is supplied from the compressor 110 to the air drier 111, if the internal pressure of the tank 118 is lower than or equal to the set pressure, the drain valve device 113 of the air drier 111 is closed. Meanwhile, the governor device 119 does not output an air pressure signal. In this state, the compressed air flows into the check valve 120 through the first port 126 but does not flow into the third port 128. The pressure of the compressed air is thus applied to the surface of the piston 150 facing valve seat 139 but not to the end of the piston 150 adjacent to the third port 128. This separates the end of the piston 150 facing the valve seat 139 from the valve seat 139 and brings the end of the piston 150 adjacent to the third port 128 into contact with the end face 145b of the receiving hole 145. The first port 126 and the second port 127 are thus both in an open state. As has been described, since the first port 126 is connected to the compressor 110, the outer circumferential surface of the piston 150 does not receive the pressure of the compressed air. This minimizes displacement of the axis of the piston 150 and the axis of the valve seat 139 from each other. By minimizing such displacement of the axes, damage to at least one of the valve seat 139 and the piston 150 at the time the piston 150 contacts the valve seat 139 is reduced. Air leakage caused by such damage is thus reduced.

The compressed air is supplied from the compressor 110 to the air drier 111 through the check valve 120. The dry compressed air, which has been dehumidified by the air drier 111, is retained in the tank 118. The dry compressed air, which is retained in the tank 118, is used to operate the air system.

As illustrated in FIG. 12, when the internal pressure of the tank 118 exceeds the set pressure, the governor device 119 provides the air pressure signal to the third port 128. Meanwhile, the dry compressed air is supplied from the governor device 119 to the drain valve device 113 of the air drier 111, thus opening the drain valve device 113.

The pressure of the dry compressed air that has been supplied to the third port 128 causes the piston 150 of the check valve 120 to slide in the receiving hole 145 toward the first port 126. The corresponding end of the piston 150 thus contacts the valve seat 139, thus closing the first port 126 and the second port 127. At this time, the contact member 160 of the piston 150, which is an elastic body, contacts the valve seat 139 and is thus elastically deformed to tightly contact the valve seat 139. When the contact member 160 is elastically deformed, the support portion 151a of the slidable-contact member 151 of the piston 150 supports the contact member 160. Excessive deformation of the contact member 160 is thus restrained to promote tight contact between the contact member 160 and the valve seat 139. This also restrains trapping and sagging of a deformed portion of the contact member 160 between the slidable-contact member 151 and the valve seat 139.

The first sealing member 155, which is arranged in the piston 150, is arranged on the side corresponding to the first port 126 with respect to the second sealing member 156. The first sealing member 155 is thus exposed to high temperature and the oil and water contained in the compressed air. However, since the first sealing member 155 is made of a heat-resistant and oil-resistant material, deterioration of the first sealing member 155 is minimized.

Also, the piston 150 has both the first sealing member 155 and the second sealing member 156. As a result, if one of the sealing members is deteriorated but the other one is not, the non-deteriorated sealing member ensures an adequate sealing performance between the first body member 122 and the second body member 123.

As described above, the present embodiment achieves the following advantages.

(6) The contact member 160 of the piston 150, which contacts the first body member 122 of the check valve 120, is an elastic body. The contact member 160 is fixed to the slidable-contact member 151 of the piston 150 by the pin 170. As a result, in a valve closing time in which the piston 150 contacts the first body member 122, the contact member 160, which is an elastic body, contacts the first body member 122 and is thus elastically deformed to bring about tight closure. This improves the sealing performance in the valve closing time.

(7) The contact member 160 is pressed-fitted to the accommodating portion by the pin 170. The formation of a gap between the slidable-contact member 151 and the contact member 160 is thus minimized. This reduces the entry of the compressed air with respect to the gap between the slidable-contact member 151 and the contact member 160, thus improving the sealing performance in the valve closing time.

(8) The support portion 151a supports the outer periphery of the contact member 160. As a result, even when the contact member 160 contacts the first body member 122 of the check valve 120 and is deformed, excessive deformation of the contact member 160 is minimized, thus minimizing sagging of the contact member 160. Also, if the contact member 160 is excessively deformed, the support portion 151a will contact the first body member 122 of the check valve 120 to restrain excessive movement of the piston 150 during the valve closing time.

(9) The second body member 123 having the slidable-contact portion, which slidably contacts the piston 150, is independent of the first body member 122. The second body member 123 is threaded into and thus assembled with the first body member 122. The second body member 123 is thus easy to detach and attach at the time of maintenance.

Other Embodiments

The above-described embodiments may be modified as follows.

Figure 13:
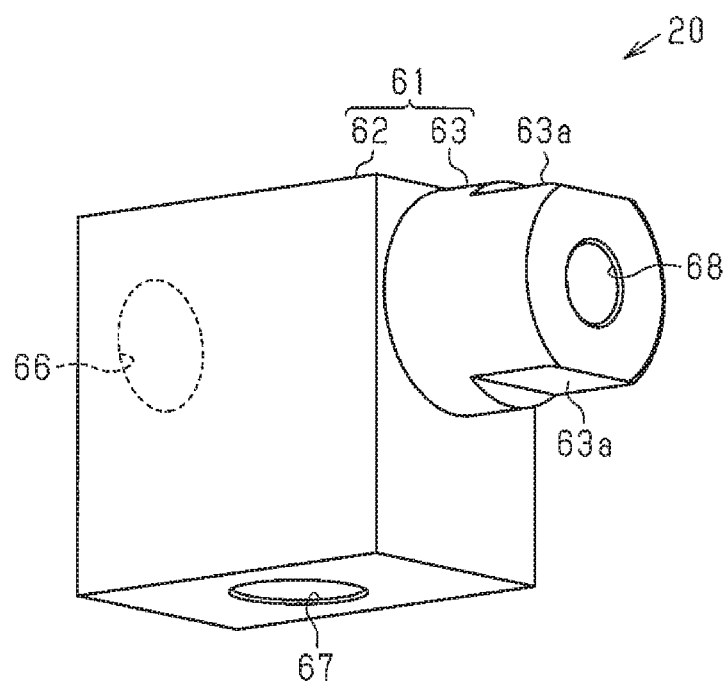
FIG. 13 is a perspective view showing a modification of the turbo check valve as viewed from the side corresponding to a third port.

As illustrated in FIG. 13, a body 61 of the turbo check valve 20 may include a first body member 62, which is shaped like a rectangular parallelepiped, and a second body member 63, which has a substantially cylindrical shape. The first body member 62 has a first port 66 and a second port 67. The second body member 63 has a third port 68 and includes two flat side surfaces 63a at positions symmetrical with respect to the third port 68. That is, the first body member 62 and the second body member 63 may have any shapes other than those of the first embodiment.

Figure 14:
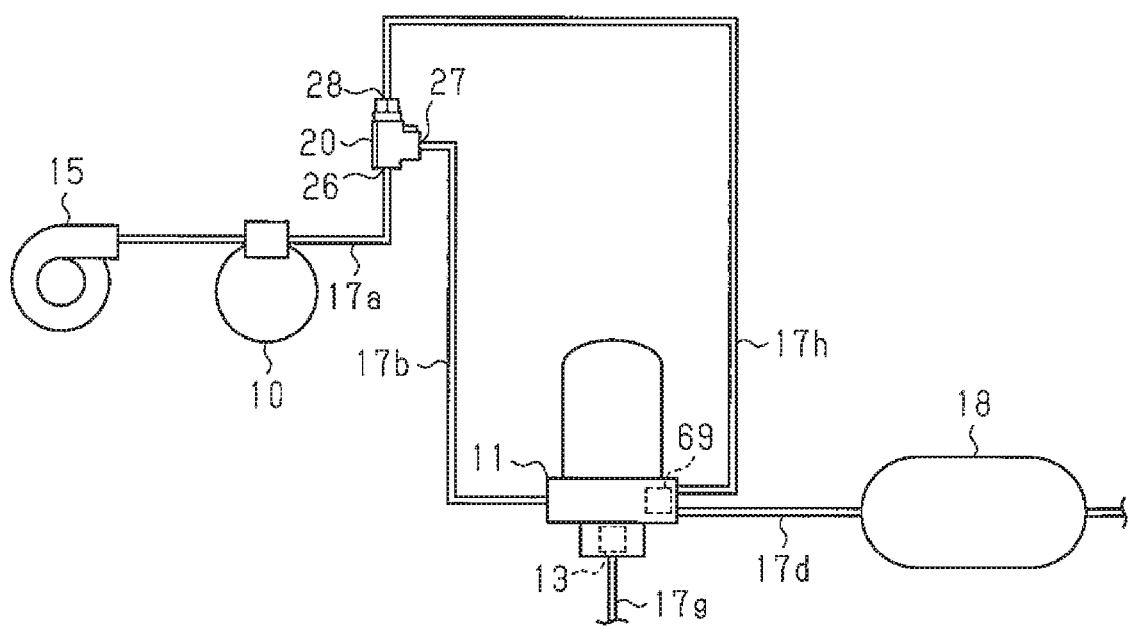
FIG. 14 is a block diagram schematically representing the configuration of a modification of the compressed air drying system.

With reference to FIG. 14, the air drier 11 may incorporate a governor device 69, in addition to the non-return valve (not shown in FIG. 14) and the drain valve device 13. When the internal pressure of the main tank 18 exceeds the set pressure, the governor device 69 delivers dry compressed air (provides an air pressure signal) to the turbo check valve 20 through the line 17h to switch the turbo check valve 20 to a closed state.

In each of the first and second embodiments, the first sealing member 55, 155 and the second sealing member 56, 156 are made of different materials. However, the first sealing member 55, 155 and the second sealing member 56, 156 may be made of the same heat-resistant and oil-resistant material.

Although the piston 50 includes the oil retainer 57 in the first embodiment, the oil retainer 57 may be omitted, for example, if shortage of lubricant oil between the second body member 23 and the piston 50 is unlikely to occur.

In the first embodiment, the line 17c, which connects the governor device 19 and the turbo check valve 20 together, branches off the line 17f, which connects the governor device 19 and the drain valve device 13 together. However, these lines 17c, 17f may connected to the governor device 19 independently of each other. In this case, if the governor device 19 is a device (for example, an electromagnetic valve) capable of transmitting an air pressure signal to the lines 17c, 17f independently of each other, the opening/closing timing of the turbo check valve 20 and the opening/closing timing of the drain valve device 13 can be controlled independently of each other.

In each of the first and second embodiments, the second body member 23, 123 is the slidable-contact portion. However, only the slidable-contact portion that is the section of the second body member 23, 123 that slidably contacts the piston 50, 150 may be made of a material different from the material of the piston 50, 150. The rest of the second body member 23, 123 may be made of the same material as the piston 50, 150. For example, the slidable-contact portion of the second body member 23, 123 may be a tubular component arranged on the inner side of the second body member 23, 123 or a laminated section.

In each of the first and second embodiments, the second body member 23, 123 is the slidable-contact portion. However, only the slidable-contact portion that is the section of the piston 50, 150 that slidably contacts the second body member 23, 123 may be made of a material different from the material of the second body member 23, 123. The rest of the piston 50, 150 may be made of the same material as the second body member 23, 123. For example, the slidable-contact portion of the piston 50, 150 may be a tubular component arranged on the outer side of the piston 50, 150 or a laminated section, which is, for example, Teflon (trademark) coating.

In each of the first and second embodiments, to prioritize the durability of the sealing member between the second body member 23, 123 and the piston 50, 150, it would be sufficient to arrange at least the first sealing member 55, 155 and the second sealing member 56, 156 in the piston 50, 150. The hardness of the material of the second body member 23, 123 and the hardness of the material of the piston 50, 150 may be equal to each other.

In each of the first and second embodiments, to prioritize the decrease of wear-caused reduction of the sealing performance between the second body member 23, 123 and the piston 50, 150, it would be sufficient to differentiate at least the hardness of the material of the second body member 23, 123 from the hardness of the material of the piston 50, 150. Therefore, the piston 50, 150 may have only the first sealing member 55, 155.

In each of the first and second embodiments, the second port 27, 127 of the turbo check valve 20, 120 is connected to the air drier 11, 111 serving as the removal device (a quality regulating device). However, the second port 27, 127 may be connected to an oil mist separator. The oil mist separator includes, instead of the desiccant, a filter that separates air from liquid by striking compressed air. The oil mist separator thus traps the oil contained in the compressed air delivered from the compressor 10, 110. The filter may be either a compression molding product of a metal material or a porous material such as a sponge. The discharge port of the oil mist separator is connected to the air drier 11, 111. Even this configuration is capable of preventing a decrease of the forced-induction pressure of the forced-induction device.

In each of the first and second embodiments, the first port 26, 126 of the turbo check valve 20, 120 is connected to the compressor 10, 110. However, if the piston 50, 150 has a high rigidity and displacement of the axis of the piston 50, 150 and the axis of the valve seat 39, 139 from each other is unlikely to occur, the second port 27, 127 may be connected to the compressor 10, 110.

Figure 18:
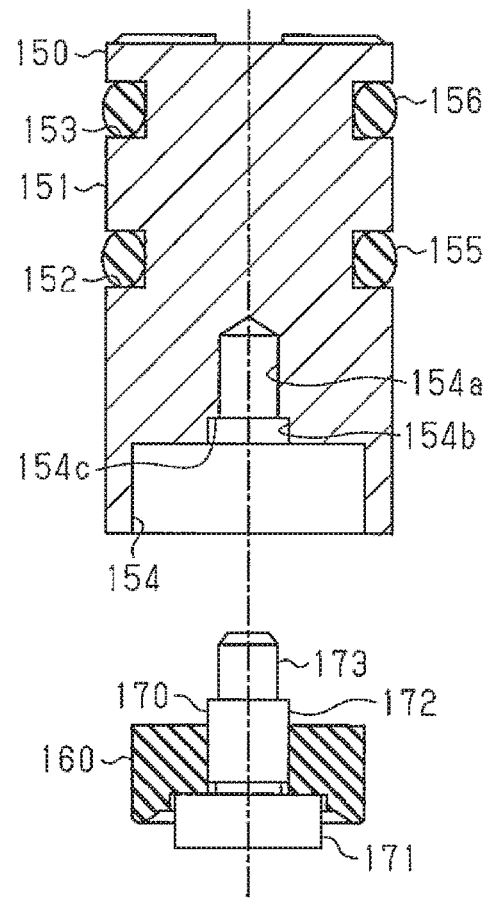
FIG. 18 is a cross-sectional view showing a piston of a modification of the compressed air drying system.
Figure 19:
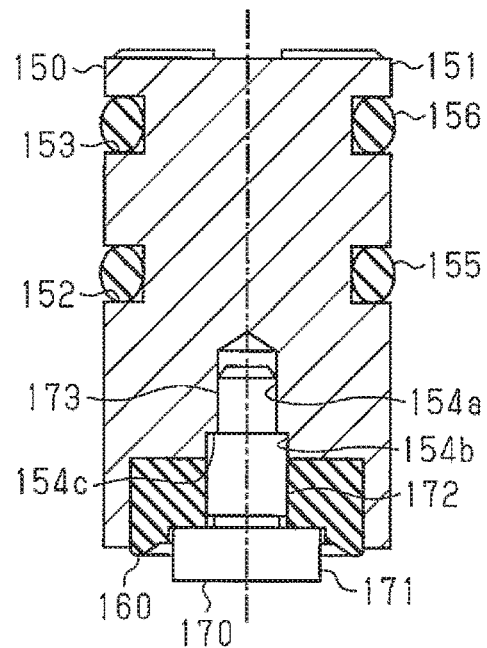
FIG. 19 is an exploded perspective view showing the piston and a pin of FIG. 18.

Although the pin 170 is configured to have the flat portion 171 and the columnar portion 172 in the first embodiment, the pin 170 may be configured in any other manner. For example, referring to FIG. 18, the pin 170 may be configured to include the flat portion 171, the columnar portion 172, and a guide 173. The guide 173 has a columnar shape having a diameter smaller than the diameter of the columnar portion 172. The slidable-contact member 151 has the fixing hole 154*a* and a communication hole 154*b*, which allows communication between the fixing hole 154*a* and the accommodating portion 154. The guide 173 is accommodated in the fixing hole 154*a*. The outer diameter of the columnar portion 172 is set greater than the inner diameter of the communication hole 154*b* of the slidable-contact member 151. The columnar portion 172 is thus pressed-fitted to the communication hole 154*b* by being pressed into the communication hole 154*b*. The communication hole 154*b* has a stopper surface 154*c*, which contacts the distal end of the columnar portion 172. As shown in FIG. 19, when the pin 170 is accommodated in the accommodating portion 154, the guide 173 is inserted into the fixing hole 154*a* and the distal end of the columnar portion 172 and the stopper surface 154*c* contact each other. That is, the stopper surface 154*c*, which contacts the pin 170 and the slidable-contact member 151, is arranged in front of the fixing hole 154*a*. The accuracy of the depth of the fixing hole 154*a* may thus be lower than that of the first embodiment. Further, by inserting the guide 173 into the fixing hole 154*a*, the posture of the pin 170 is stabilized.

Figure 20:
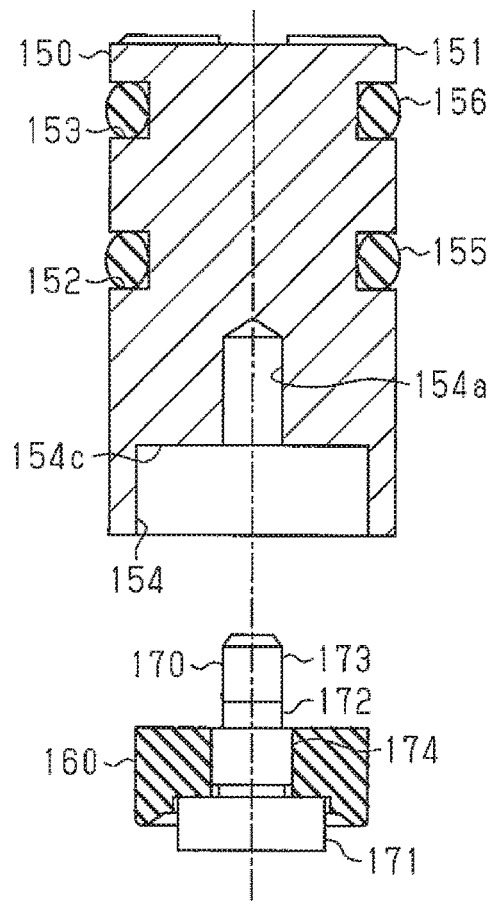
FIG. 20 is a cross-sectional view showing a piston of a modification of the compressed air drying system.
Figure 21:
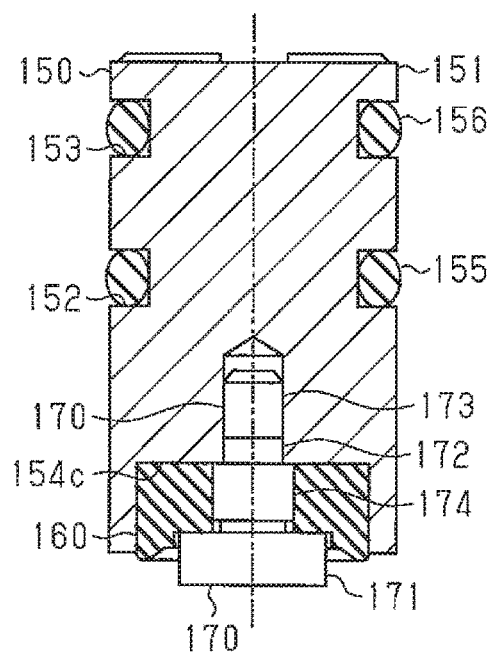
FIG. 21 is an exploded perspective view showing the piston and a pin of FIG. 20.

Alternatively, with reference to FIG. 20, the pin 170 may include a stopper portion 174 between the flat portion 171 and the columnar portion 172 as well as the flat portion 171, the columnar portion 172, and the guide 173. The outer diameter of the columnar portion 172 is set greater than the inner diameter of the fixing hole 154*a* of the slidable-contact member 151. The columnar portion 172 is thus pressed-fitted to the fixing hole 154*a* by being pressed into the fixing hole 154*a*. The stopper portion 174 has a columnar shape and has an outer diameter greater than the inner diameter of the fixing hole 154*a* of the slidable-contact member 151. Referring to FIG. 21, when the pin 170 is accommodated in the accommodating portion 154, the columnar portion 172 is inserted into the fixing hole 154*a* and the stopper portion 174 and a side surface of the accommodating portion 154 contact each other. That is, the stopper surface 154*c*, which contacts the pin 170 and the slidable-contact member 151, is arranged in front of the fixing hole 154*a*. The accuracy of the depth of the fixing hole 154*a* may thus be lower than that of the first embodiment. Further, by inserting the guide 173 into the fixing hole 154*a*, the posture of the pin 170 is stabilized.

In the second embodiment, the body 121 of the check valve 120 includes the first body member 122, which is shaped like a rectangular parallelepiped, and the second body member 123, which has a substantially cylindrical shape. However, the first body member 122 may have any shape other than that of the above-descried embodiment, such as a shape combining a tubular member having the first port 126 and a tubular member having the second port 127.

Figure 15:
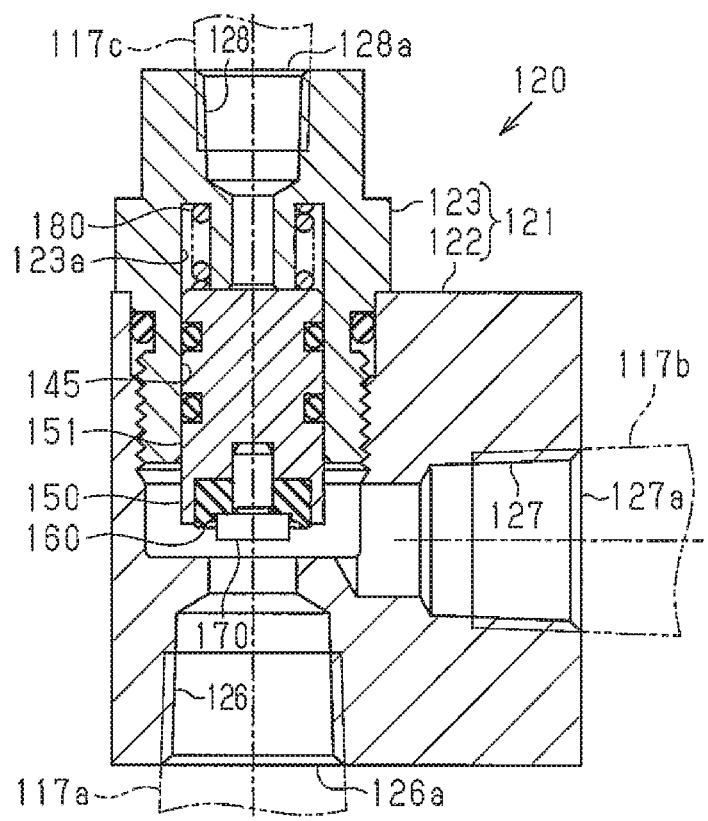
FIG. 15 is a cross-sectional view showing a modification of the check valve in an open state.

As shown in FIG. 15, the configuration of the second embodiment may have an urging spring 180, which urges the piston 150 toward the valve seat 139. The urging spring 180 is accommodated in a spring accommodating portion 123*a*, which is arranged in the second body member 123, and urges the piston 150 toward the valve seat 139. By arranging the urging spring 180 in this manner, the piston 150 is moved toward the valve seat 139 to close the check valve 120 at the time point at which a slight air pressure signal (a slight amount of compressed air) flows from the governor device 119 into the third port 128.

In the second embodiment, the slidable-contact member 151 has the support portion 151*a*, which supports the outer periphery of the contact member 160. However, if the contact member 160 does not need to be supported, the support portion 151*a* may be omitted.

In the second embodiment, the contact member 160 is accommodated in a projected state and the slidable-contact member 151 has the accommodating portion 154, to which the contact member 160 is pressed-fitted by the pin 170. However, the configuration of the accommodating portion 154 for accommodating the contact member 160 may be omitted and the contact member 160 may be fixed directly to the slidable-contact member 151.

Figure 16:
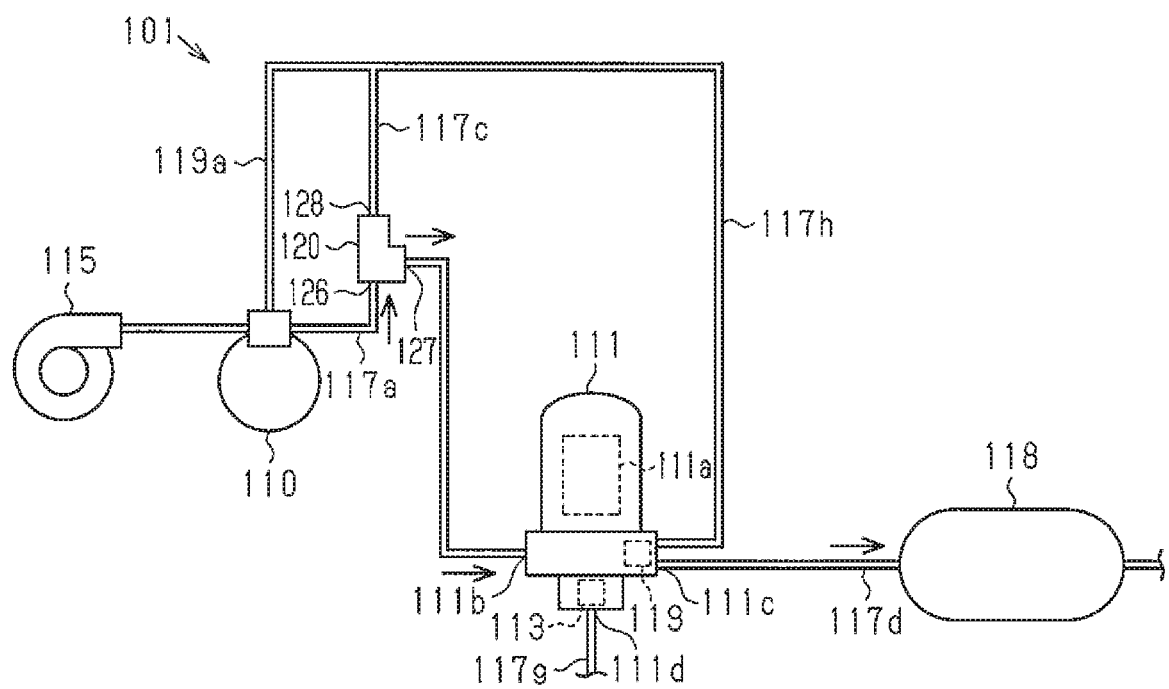
FIG. 16 is a block diagram representing the flow of compressed air in a loading mode operation of an air drier of a modification of the compressed air drying system.
Figure 17:
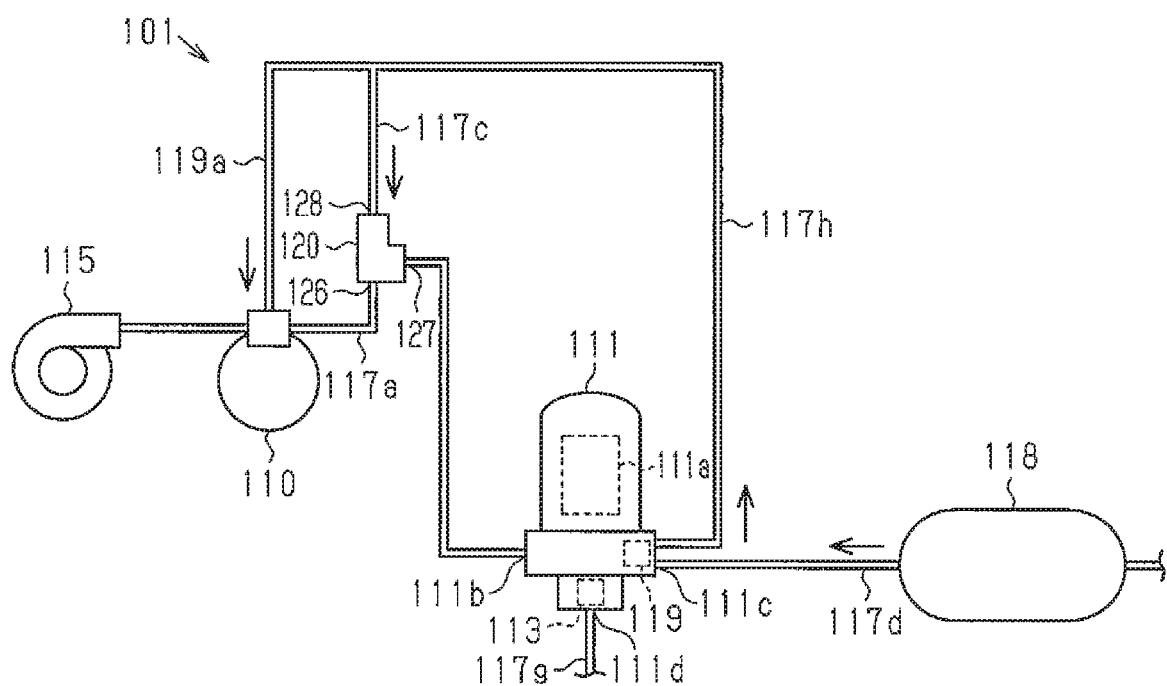
FIG. 17 is a block diagram representing the flow of compressed air in an unloading mode operation of the air drier of the compressed air drying system of FIG. 16.

With reference to FIGS. 16 and 17, the air drier 111 of the second embodiment may incorporate the governor device 119, in addition to the non-return valve (not shown) and the drain valve device 113. When the internal pressure of the tank 118 exceeds the set pressure, the governor device 119 delivers dry compressed air (provides an air pressure signal) to the check valve 120 through the line 117*h* to switch the check valve 120 to a closed state.

In the second embodiment, the check valve 120 is attached to the compressed air drying system 101 such that the piston 150 is arranged vertically above the second port 127. However, if retaining of water and oil on the side corresponding to the sealing members 55, 56 does not cause a problem, the check valve 120 does not necessarily have to be attached to the compressed air drying system 101 such that the piston 150 is arranged vertically above the second port 127.

In the second embodiment, the line 117*c*, which connects the governor device 119 and the check valve 120 together, branches off the line 119*a*, which connects the governor device 119 and the compressor 110 together. However, these lines 117*c*, 19*a* may be lines connected to the governor device 119 independently of each other. In this case, if the governor device 119 is a device (for example, an electromagnetic valve) capable of transmitting an air pressure signal to the lines 117*c*, 19*a* independently of each other, the opening/closing timing of the check valve 120 and the opening/closing timing of the drain valve device 113 can be controlled independently of each other.

In the second embodiment, the first port 126 of the check valve 120 is connected to the compressor 110. However, if the piston 150 has a high rigidity and displacement of the axis of the piston 150 and the axis of the valve seat 139 from each other is unlikely to occur, the second port 127 may be connected to the compressor 110 and the first port 126 may be connected to the drier.

In the second embodiment, the compressed air drying system 101 purifies the compressed air delivered from the compressor 110, which is connected to the forced-induction device 115. However, the compressed air drying system may purify compressed air delivered from a compressor that is non-connected to a forced-induction device.

In the second embodiment, the compressed air drying system 101 is employed as a compressed air drying system mounted in a vehicle. However, the compressed air drying system 101 may be employed as any other system, as long as the system purifies compressed air delivered from a compressor connected to a forced-induction device. For example, the compressed air drying system 101 may be employed in any movable body other than the vehicle, such as a train, a ship, or an airplane. Alternatively, the compressed air drying system 101 may be employed as a system that is mounted in a structure other than the movable body and operates using air pressure.

The invention claimed is:

1. A compressed air drying system comprising:
   a compressor configured such that a forced-induction device is connected to the compressor;
   a removal device that performs a loading mode operation, in which at least one of water and oil contained in compressed air delivered from the compressor is trapped, and an unloading mode operation, in which collected liquid containing the at least one of water and oil that has been trapped is discharged through a drain valve device;
   a pressure regulating device that is arranged inside or outside the removal device and selectively opens and closes the drain valve device using air pressure; and
   a check valve, which includes a body and a piston, wherein the body has a first port connected to the compressor, a second port connected to the removal device, and a third port connected to the pressure regulating device, and the piston is slidably arranged in the body,
   wherein a hardness of at least a material of a slidable-contact portion of the body that slidably contacts the piston is different from a hardness of a material of the piston.

2. The compressed air drying system according to claim 1, wherein the body includes a first body member, in which a passage that connects the first port, the second port, and the third port together is formed, and a tubular second body member, wherein the slidable-contact portion is arranged in the second body member,
   wherein an internal thread is arranged in an inner circumferential surface of the passage of the first body member, and
   wherein an external thread that is threaded into the internal thread is arranged in an outer circumferential surface of the second body member.

3. The compressed air drying system according to claim 2, wherein the first body member includes an attachment port to which the second body member is attached,
   wherein a sealing member is arranged between the first body member and the second body member, and
   wherein, in a state in which the second body member is attached to the first body member, a length from the attachment port to the sealing component is shorter than a length of a section in which the internal thread and the external thread are threaded together.

4. A check valve used in a compressed air drying system, the compressed air drying system including
   a compressor configured such that a forced-induction device is connected to the compressor,
   a removal device that performs a loading mode operation, in which at least one of water and oil contained in compressed air delivered from the compressor is trapped, and an unloading mode operation, in which collected liquid containing the at least one of water and oil that has been trapped is discharged through a drain valve device; and
   a pressure regulating device that is arranged inside or outside the removal device and selectively opens and closes the drain valve device using air pressure,
   the check valve comprising:
      a body having a first port connected to the compressor, a second port connected to the removal device, and a third port connected to the pressure regulating device; and
      a piston that is slidably arranged in the body,
      wherein a hardness of at least a material of a slidable-contact portion of the body that slidably contacts the piston is different from a hardness of a material of the piston.

5. The check valve according to claim 4, wherein the body includes a first body member, in which a passage that connects the first port, the second port, and the third port together is formed, and a tubular second body member, wherein the slidable-contact portion is arranged in the second body member,
   wherein an internal thread is arranged in an inner circumferential surface of the passage of the first body member, and
   wherein an external thread that is threaded into the internal thread is arranged in an outer circumferential surface of the second body member.

6. The check valve according to claim 5, wherein the first body member includes an attachment port to which the second body member is attached,
   wherein a sealing member is arranged between the first body member and the second body member, and
   wherein, in a state in which the second body member is attached to the first body member, a length from the attachment port to the sealing component is shorter than a length of a section in which the internal thread and the external thread are threaded together.

7. The check valve according to claim 4, wherein a plurality of sealing members are arranged between the piston and the body.

8. The check valve according to claim 7, wherein a material of a first sealing member arranged at a position closest to the first port connected to the compressor among the sealing members is different from a material of a second sealing member arranged at a position farthest from the first port, and
   wherein an oil resistance and a heat resistance of the first sealing member are higher than an oil resistance and a heat resistance of the second sealing member.

9. The compressed air drying system according to claim 1, wherein a plurality of sealing members are arranged between the piston and the body.

10. The compressed air drying system according to claim 9, wherein a material of a first sealing member arranged at a position closest to the first port connected to the compressor among the sealing members is different from a material of a second sealing member arranged at a position farthest from the first port, and
wherein an oil resistance and a heat resistance of the first sealing member are higher than an oil resistance and a heat resistance of the second sealing member.

\* \* \* \* \*